US 7,031,090 B2

(12) United States Patent
Ichihara et al.

(10) Patent No.: US 7,031,090 B2
(45) Date of Patent: Apr. 18, 2006

(54) INFORMATION RECORDING AND REPRODUCING APPARATUS AND METHOD AND SIGNAL DECODING CIRCUIT HAVING IMPROVED NOISE PROCESSING CHARACTERISTICS

(75) Inventors: Kazuhito Ichihara, Kawasaki (JP); Takao Sugawara, Kawasaki (JP); Yuichi Sato, Kawasaki (JP); Toshihiko Morita, Kawasaki (JP); Motomu Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 404 days.

(21) Appl. No.: 10/045,738

(22) Filed: Oct. 29, 2001

(65) Prior Publication Data

US 2003/0026028 A1    Feb. 6, 2003

(30) Foreign Application Priority Data

Jun. 11, 2001    (JP) ............................. 2001-176221

(51) Int. Cl.
*G11B 5/035* (2006.01)

(52) U.S. Cl. .......................................... 360/65; 360/46

(58) Field of Classification Search ................ 360/65, 360/46, 53, 31, 77.02; 714/794, 795; 375/227, 375/229, 230, 231, 232, 262, 263, 341, 346, 375/254, 278, 284, 285, 296
See application file for complete search history.

(56) References Cited

U.S. PATENT DOCUMENTS

| | | | |
|---|---|---|---|
| 5,754,353 A | 5/1998 | Behrens et al. | |
| 5,889,823 A | 3/1999 | Agazzi et al. | |
| 6,185,175 B1 | 2/2001 | Zook | |
| 2003/0152175 A1* | 8/2003 | Kuki et al. | ................. 375/350 |

FOREIGN PATENT DOCUMENTS

| | | |
|---|---|---|
| EP | 0801484 A2 | 10/1997 |
| EP | 0801484 A3 | 1/1999 |
| JP | 01309549 | 12/1989 |
| JP | 11238320 | 8/1991 |
| JP | 03278373 | 12/1991 |
| JP | 4-182968 | 6/1992 |
| JP | 09251604 | 9/1997 |
| JP | 11-312984 | 11/1999 |

* cited by examiner

OTHER PUBLICATIONS

Coding to Improve SNR in Magnetic Recording; Conway T., et al., Electronics Letters, IEE Stevenage, GB, vol. 32, No. 7, Mar. 28, 1996, pp. 621-622.

*Primary Examiner*—David Hudspeth
*Assistant Examiner*—Varsha A. Kapadia
(74) *Attorney, Agent, or Firm*—Greer, Burns, & Crain, Ltd.

(57) ABSTRACT

In a Maximum A posteriori Probability decoding (MAP decoding), a correlation and a deviation of noises for past and future states which depend on input signal patterns in past N bits and future Q bits are calculated by training by a noise correlation arithmetic operating unit 84 and they are stored. Upon reproduction, in a white noise arithmetic operating unit 91, white noise values for the past and future states in which colored noises are converted into white noises are obtained by using the stored correlation and deviation of the noises. In an input signal arithmetic operating unit 92, an input signal (channel information) $\Lambda c(y_k | S^m_k)$ of the MAP decoding is calculated from the white noise values and the deviation for the past and future states. A likelihood in the MAP decoding is obtained from the input signal.

66 Claims, 21 Drawing Sheets

| $x_{k-1}x_k$ | $S_0$ |
|---|---|
| 0 0 | $S_1$ |
| 0 1 | $S_2$ |
| 1 0 | $S_3$ |
| 1 1 | $S_4$ |

FIG. 9

| $x_{k-N}$ | ... | $x_{k-1}$ | $x_k$ | $x_{k+1}$ | ... | $x_{k+Q}$ | STATE | MEAN VALUE OF WAVEFORM AFTER EQUALIZATION |
|---|---|---|---|---|---|---|---|---|
| 0 | ... | 0 | 0 | 0 | ... | 0 | $S^m_0$ | $d(S^m_0)$ |
| 0 | ... | 0 | 0 | 0 | ... | 1 | $S^m_1$ | $d(S^m_1)$ |
| ... | ... | ... | ... | ... | ... | ... | ...... | ...... |
| 1 | ... | 1 | 1 | 1 | ... | 0 | $S^m_{2^{(N+Q+1)}-2}$ | $d(S^m_{2^{(N+Q+1)}-2})$ |
| 1 | ... | 1 | 1 | 1 | ... | 1 | $S^m_{2^{(N+Q+1)}-1}$ | $d(S^m_{2^{(N+Q+1)}-1})$ |

RECORDING SIGNAL $x_k$ ON MEDIUM

FIG. 11

| STATE | CORRELATION OF NOISES | | | | | | | STANDARD DEVIATION OF NOISES |
|---|---|---|---|---|---|---|---|---|
| | $e_{-L}(S^m_k)$ | ... | $e_{-1}(S^m_k)$ | $e_1(S^m_k)$ | ... | $e_M(S^m_k)$ | | $\sigma(S^m_k)$ |
| $S^m_0$ | $e_{-L}(S^m_0)$ | ... | $e_{-1}(S^m_0)$ | $e_1(S^m_0)$ | ... | $e_M(S^m_0)$ | | $\sigma(S^m_0)$ |
| $S^m_1$ | $e_{-L}(S^m_1)$ | ... | $e_{-1}(S^m_1)$ | $e_1(S^m_1)$ | ... | $e_M(S^m_1)$ | | $\sigma(S^m_1)$ |
| ...... | ...... | ... | ...... | ...... | ... | ...... | | ...... |
| $S^m_{2^{(N+Q+1)}-2}$ | $e_{-L}(S^m_{2^{(N+Q+1)}-2})$ | ... | $e_{-1}(S^m_{2^{(N+Q+1)}-2})$ | $e_1(S^m_{2^{(N+Q+1)}-2})$ | ... | $e_M(S^m_{2^{(N+Q+1)}-2})$ | | $\sigma(S^m_{2^{(N+Q+1)}-2})$ |
| $S^m_{2^{(N+Q+1)}-1}$ | $e_{-L}(S^m_{2^{(N+Q+1)}-1})$ | ... | $e_{-1}(S^m_{2^{(N+Q+1)}-1})$ | $e_1(S^m_{2^{(N+Q+1)}-1})$ | ... | $e_M(S^m_{2^{(N+Q+1)}-1})$ | | $\sigma(S^m_{2^{(N+Q+1)}-1})$ |

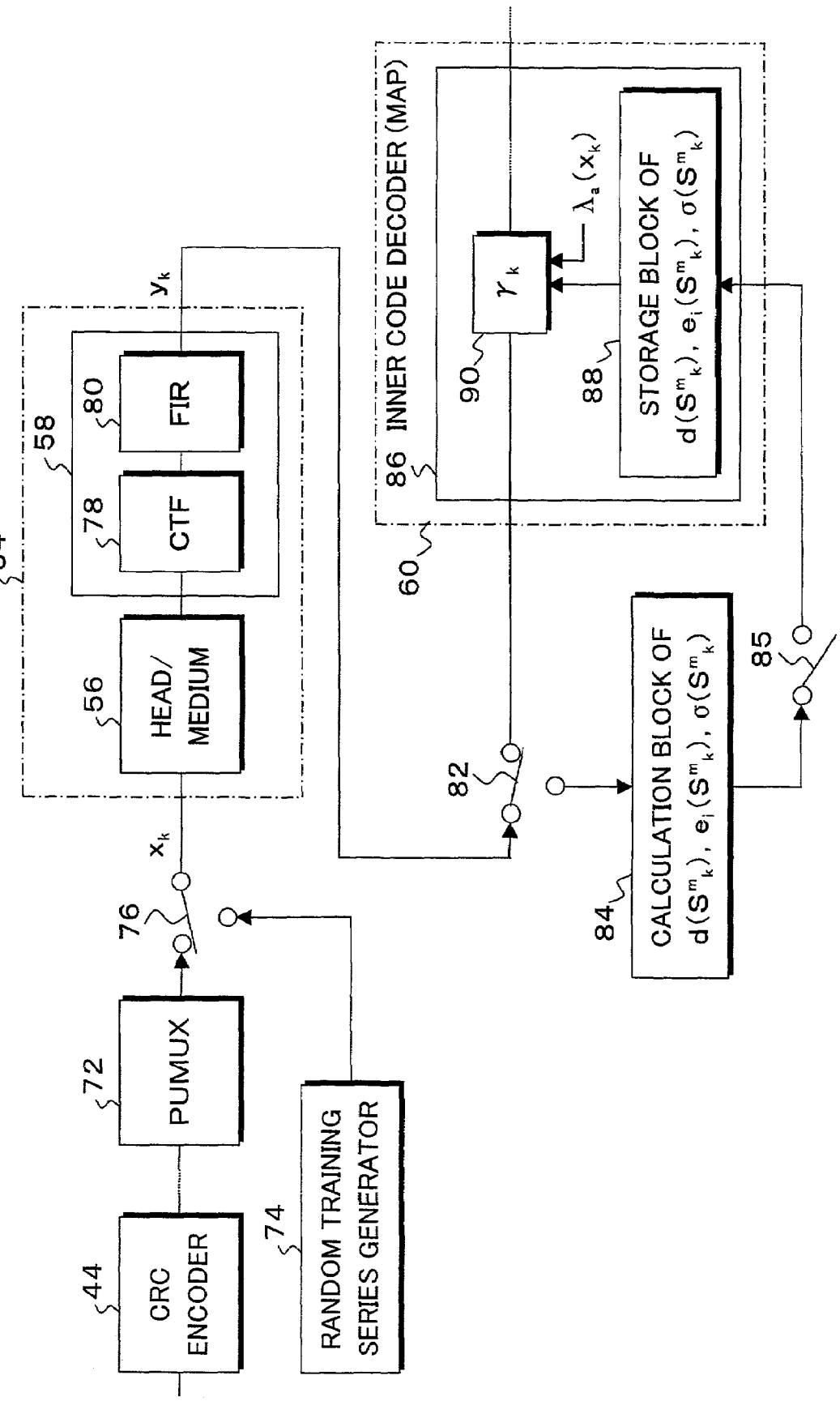

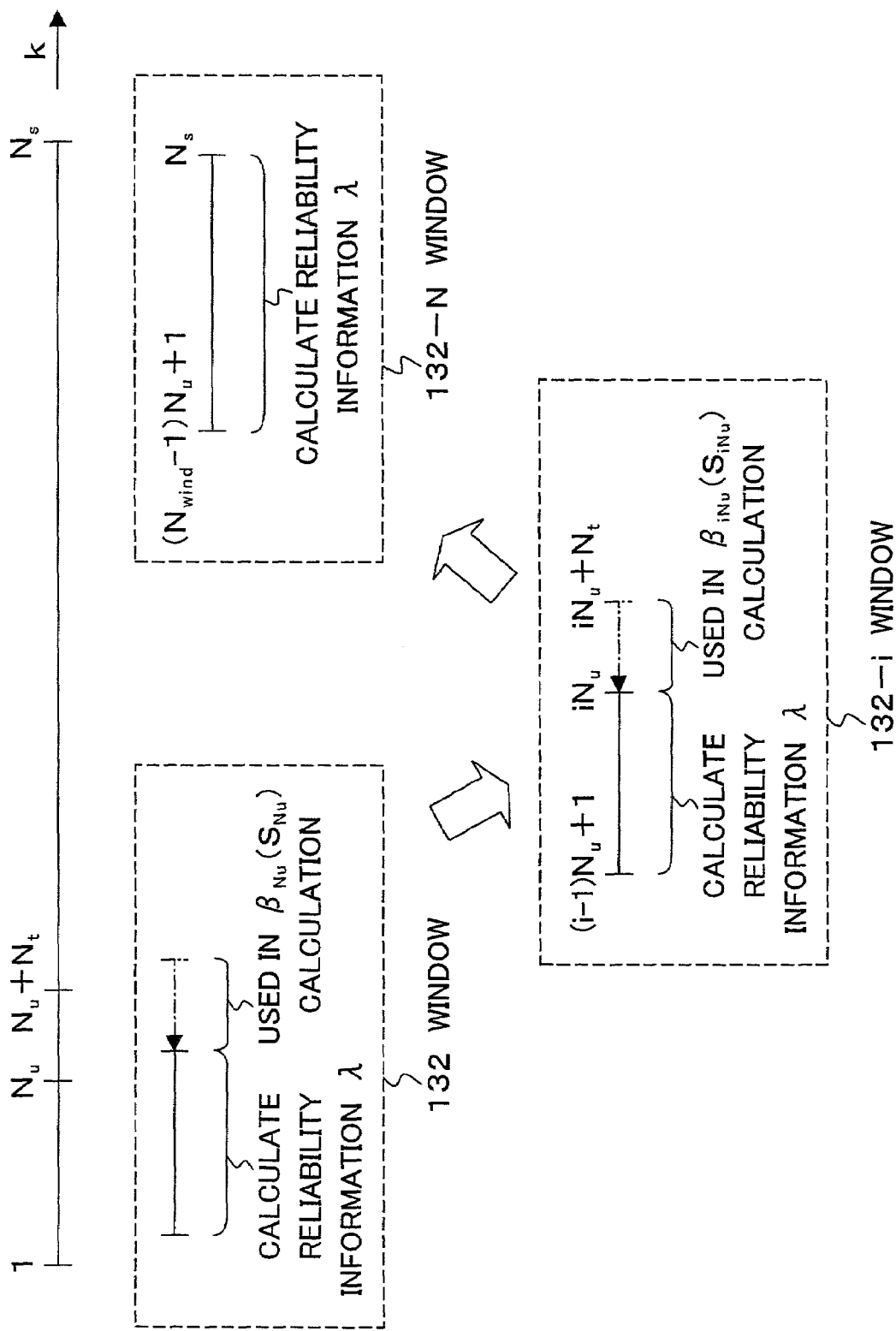

FIG. 18

| $x_{k-3}x_{k-2}x_{k-1}x_k$ | STATE |
|---|---|
| 0000 | $S^m_0$ |
| 0001 | $S^m_1$ |
| 0010 | $S^m_2$ |
| 0011 | $S^m_3$ |
| 0100 | $S^m_4$ |
| 0101 | NOT EXIST |
| 0110 | $S^m_6$ |
| 0111 | $S^m_7$ |
| 1000 | $S^m_8$ |
| 1001 | $S^m_9$ |
| 1010 | NOT EXIST |
| 1011 | $S^m_{11}$ |
| 1100 | $S^m_{12}$ |
| 1101 | $S^m_{13}$ |
| 1110 | $S^m_{14}$ |
| 1111 | $S^m_{15}$ |

FIG. 20

| STATE | CORRELATION OF NOISES | | | | | | STANDARD DEVIATION OF NOISES | MEAN VALUE OF EQUALIZATION SIGNAL |
|---|---|---|---|---|---|---|---|---|
| | $e_{-L}(S^m_k)$ | ... | $e_{-1}(S^m_k)$ | $e_1(S^m_k)$ | ... | $e_M(S^m_k)$ | $\sigma(S^m_k)$ | $d(S^m_k)$ |
| $S^m_0$ | $e_{-L}(S^m_0)$ | ... | $e_{-1}(S^m_0)$ | $e_1(S^m_0)$ | ... | $e_M(S^m_0)$ | $\sigma(S^m_0)$ | $d(S^m_0)$ |
| $S^m_1$ | $e_{-L}(S^m_1)$ | ... | $e_{-1}(S^m_1)$ | $e_1(S^m_1)$ | ... | $e_M(S^m_1)$ | $\sigma(S^m_1)$ | $d(S^m_1)$ |
| $S^m_2$ | $e_{-L}(S^m_2)$ | ... | $e_{-1}(S^m_2)$ | $e_1(S^m_2)$ | ... | $e_M(S^m_2)$ | $\sigma(S^m_2)$ | $d(S^m_2)$ |
| $S^m_3$ | $e_{-L}(S^m_3)$ | ... | $e_{-1}(S^m_3)$ | $e_1(S^m_3)$ | ... | $e_M(S^m_3)$ | $\sigma(S^m_3)$ | $d(S^m_3)$ |
| $S^m_4$ | $e_{-L}(S^m_4)$ | ... | $e_{-1}(S^m_4)$ | $e_1(S^m_4)$ | ... | $e_M(S^m_4)$ | $\sigma(S^m_4)$ | $d(S^m_4)$ |
| NOT EXIST | — | ... | — | — | ... | — | — | — |
| $S^m_6$ | $e_{-L}(S^m_6)$ | ... | $e_{-1}(S^m_6)$ | $e_1(S^m_6)$ | ... | $e_M(S^m_6)$ | $\sigma(S^m_6)$ | $d(S^m_6)$ |
| $S^m_7$ | $e_{-L}(S^m_7)$ | ... | $e_{-1}(S^m_7)$ | $e_1(S^m_7)$ | ... | $e_M(S^m_7)$ | $\sigma(S^m_7)$ | $d(S^m_7)$ |
| $S^m_8$ | $e_{-L}(S^m_8)$ | ... | $e_{-1}(S^m_8)$ | $e_1(S^m_8)$ | ... | $e_M(S^m_8)$ | $\sigma(S^m_8)$ | $d(S^m_8)$ |
| $S^m_9$ | $e_{-L}(S^m_9)$ | ... | $e_{-1}(S^m_9)$ | $e_1(S^m_9)$ | ... | $e_M(S^m_9)$ | $\sigma(S^m_9)$ | $d(S^m_9)$ |
| NOT EXIST | — | ... | — | — | ... | — | — | — |
| $S^m_{11}$ | $e_{-L}(S^m_{11})$ | ... | $e_{-1}(S^m_{11})$ | $e_1(S^m_{11})$ | ... | $e_M(S^m_{11})$ | $\sigma(S^m_{11})$ | $d(S^m_{11})$ |
| $S^m_{12}$ | $e_{-L}(S^m_{12})$ | ... | $e_{-1}(S^m_{12})$ | $e_1(S^m_{12})$ | ... | $e_M(S^m_{12})$ | $\sigma(S^m_{12})$ | $d(S^m_{12})$ |
| $S^m_{13}$ | $e_{-L}(S^m_{13})$ | ... | $e_{-1}(S^m_{13})$ | $e_1(S^m_{13})$ | ... | $e_M(S^m_{13})$ | $\sigma(S^m_{13})$ | $d(S^m_{13})$ |
| $S^m_{14}$ | $e_{-L}(S^m_{14})$ | ... | $e_{-1}(S^m_{14})$ | $e_1(S^m_{14})$ | ... | $e_M(S^m_{14})$ | $\sigma(S^m_{14})$ | $d(S^m_{14})$ |
| $S^m_{15}$ | $e_{-L}(S^m_{15})$ | ... | $e_{-1}(S^m_{15})$ | $e_1(S^m_{15})$ | ... | $e_M(S^m_{15})$ | $\sigma(S^m_{15})$ | $d(S^m_{15})$ |

INFORMATION RECORDING AND REPRODUCING APPARATUS AND METHOD AND SIGNAL DECODING CIRCUIT HAVING IMPROVED NOISE PROCESSING CHARACTERISTICS

BACKGROUND OF THE INVENTION

1. Field of the Invention

The invention relates to information recording and reproducing apparatus and method of a magnetic disk an MO, an optical disk, a magnetic tape, or the like and, more particularly, to information recording and reproducing apparatus and method for decoding by applying noise characteristics of a magnetic recording and reproducing system to an iterative decoding.

2. Description of the Related Arts

Hitherto, in order to reproduce a recorded signal without an error, a powerful error correcting function is installed in a recording and reproducing apparatus. The recording signal can be certainly restored from an unstable signal including noises by the error correction.

In recent years, the error correction of the recording and reproducing apparatus is realized mainly by a combination of two methods called PRML (Partial Response Maximum Likelihood) and ECC (Error Correction Code). The PRML is a method whereby a recording channel is regarded as a partial response channel (hereinafter, referred to as a PR channel) with an intersymbol interference and a Maximum Likelihood Decoding generally using a viterbi detector is executed.

In recent years, as a new encoding/decoding method in place of the PRML, a turbo encoding, an LDPC (Low Density Parity Check Code), or the like has been proposed. Those methods are generally referred to as an iterative decoding method here because the decoding is performed by an iterative calculation. As an iterative decoding method, the turbo encoding disclosed in the drawings of the specification of the U.S. Pat. No. 5,446,747 is a typical method. The turbo encoding is a parallel concatenation encoding in which two RSC (Recursive Systematic Convolutional Codes) are connected through a random interleaver; and the decoding is executed by an iterative calculation using two soft input/output decoders. Although the turbo encoding has been devised in the field of communication, in case of applying it to the PR channel of a magnetic recording and reproducing system, two constituent encoders are serially concatenated through the random interleaver. At this time, the constituent encoder near the channel is called an inner encoder and the other constituent encoder is called an outer encoder. In the PR channel, since the channel itself can be regarded as a convolutional encoder, there is no need to particularly provide the inner encoder. As an outer encoder, various outer encoders such as encoder using two RSCs, encoder using one RSC, and the like have been provided. There is also a case using an LDPC (Low Density Parity Check Code) disclosed in the literature, R. G. Gallager, "Low-Density Parity-Check Codes", Cambridge, Mass.: MIT Press, 1963.

A decoder of the iterative decoding method is constructed by two constituent decoders called an inner decoder and an outer decoder. It is a characteristic point of the iterative decoding method that an MAP (Maximum A posteriori Probability) decoding is executed. For this purpose, each of the two constituent decoders becomes an SISO (Soft-In/Soft-Out) decoder. The SISO decoder does not output a hard decision result of mere "0" or "1" but outputs reliability information such as 0.4 or 0.9. There is a BCJR (Bahl-Cocke-Jeinek-Raviv) algorithm as a specific calculating method of the soft-in soft-out (SISO) decoding for a code such as a convolutional code or the like which is defined by the state transition. The BCJR algorithm has been described in detail in the literature, L. R. Bahl et al., "Optimal decoding of linear codes for minimizing symbol error rate", IEEE Trans. Inform. Theory, Vol.20, pp. 248–287, 1974. Such an iterative decoding method has a high error correcting ability exceeding that of the PRML decoding method and is regarded as a useful encoding/decoding method of the next generation.

In the information recording and reproducing apparatus, if noise characteristics of a magnetic recording and reproducing channel are accurately predicted and applied to a decoding step, error rate performance can be improved. A decoding method serving as a base as a noise prediction scheme in the conventional information recording and reproducing apparatus is a Maximum Likelihood decoding method. For example, such decoding methods have been disclosed in the drawings of the specification of U.S. Pat. No. 6,158,027, the drawings of the specification of U.S. Pat. No. 6,104,766, the drawings of the specification of U.S. Pat. No. 5,784,415, the drawings of the specification of EPC. Patent No. WO9852330, and the like. However, according to those patents, the noise prediction scheme is not applied to an iterative decoding method such as MAP (Maximum A posteriori Probability) decoding method, turbo decoding method, LDPC (Low Density Parity Check Code) encoding method, or the like. In those patents, no consideration is made with respect to input signal pattern dependency of a noise correlation and a handling as a noise model is extremely insufficient.

On the other hand, in the paper, A. Kavcic and A. Patapoutian, "A signal-dependent autoregressive channel models", IEEE Trans. Magn., Vol. 35, No. 5, pp. 2316–2318, September 1999 or the paper, A. Kavcic, "Soft-Output Detector for Channels with Intersymbol Interference and Markov Noise Memory", Proc. IEEE Global Telecom. Conf., December, 1999, a point that a correlation to the past noises depend on an input signal pattern was discussed for the first time, and this theory is applied to a Viterbi algorithm or the MAP algorithm. However, nothing is considered with respect to a correlation to future noises. In the paper, Y. Wu and J. R. Cruz, "Noise predictive turbo systems", TMRC'2000 Paper E5, August 2000 or the paper, T. R. Oenning, "Channel capacity and coding for magnetic recording channels with media noise", PhD thesis, the University of Minnesota, September 2000, a method whereby a countermeasure method against the noise correlation based on the noise prediction scheme is applied to the iterative decoding method was discussed for the first time. However, nothing is considered with respect to a point that the noise correlation depends on a pattern of an input signal, and a handling of a noise model is insufficient.

SUMMARY OF THE INVENTION

According to the invention, there are provided information recording and reproducing apparatus and method and a signal decoding circuit, in which noise characteristics of a magnetic recording and reproducing channel are accurately converted into a model and the characteristics of this noise model are efficiently applied to a decoding step, thereby improving decoding performance.

According to the invention, there is provided an information recording and reproducing apparatus for performing a Maximum A posteriori Probability decoding (MAP decoding), comprising: a noise correlation arithmetic operating unit which calculates a correlation $e(S^m_k)$ and a deviation $\sigma(S^m_k)$ of noises such as an autocorrelation for past and future states which depend on input signal patterns $x_{k-N}, \ldots,$ and $x_{k-Q}$ in the past and future, that is, in past N bits and future Q bits; a storing unit which stores the correlation $e(S^m_k)$ and deviation $\sigma(S^m_k)$ of the noises for the past and future states; a white noise arithmetic operating unit which obtains white noise values $n_k$ for the past and future states in which colored noises are converted into white noises by using the correlation $e(S^m_k)$ and deviation $\sigma(S^m_k)$ of the noises which were stored in the storing unit; and an input signal arithmetic operating unit which calculates an input signal (channel information) $\Lambda c(y_k|S^m_k)$ of the MAP decoding from the white noise values for the past and future states and their deviation $\sigma(S^m_k)$, wherein a likelihood in the MAP decoding is obtained from this input signal. As mentioned above, according to the invention, as a noise model which is peculiar to the information recording and reproducing apparatus, a colored noise model of a Gauss-Markov type having a correlation which depends on the past and future input signal patterns is presumed and characteristics of this noise model are applied to the decoding by a method of good calculation efficiency as high as possible, thereby improving decoding performance. Particularly, by expressing the colored noise model by the Gaussian type and using an accurate correlation value (deviation) which depends on the input signal, the decoding performance is improved.

According to the invention, there is provided an information recording and reproducing apparatus for performing a general iterative decoding, comprising: a noise correlation arithmetic operating unit which similarly calculates a correlation $e(S^m_k)$ and a deviation $\sigma(S^m_k)$ of noises for past and future states which depend on input signal patterns $x_{k-N}, \ldots,$ and $x_{k-Q}$ in the past and future, that is, in past N bits and future Q bits; a storing unit which stores the correlation $e(S^m_k)$ and deviation $\sigma(S^m_k)$ of the noises for the past and future states; a white noise arithmetic operating unit which obtains white noise values $n_k$ for the past and future states in which colored noises are converted into white noises by using the correlation $e(S^m_k)$ and deviation $\sigma(S^m_k)$ of the noises for the past and future states which were stored in the storing unit; and an input signal calculating unit which calculates an input signal (channel information) $\Lambda c(y_k|S^m_k)$ of the iterative decoding from the white noise values for the past and future states and their deviation $\sigma(S^m_k)$, wherein a likelihood in the iterative decoding is obtained from this input signal. Also in this case, by expressing the colored noise model by the Gaussian type and using the accurate correlation value (deviation) which depends on the input signal, the decoding performance is improved.

According to the invention, there is provided a simple type information recording and reproducing apparatus for performing a Maximum A posteriori Probability decoding (MAP decoding), comprising: an equalizer having an equalization target at which noises obtained after an equalization become close to white noises; a noise correlation arithmetic operating unit which calculates a deviation $\sigma(S^m_k)$ of noises for past and future states which depend on input signal patterns $x_{k-N}, \ldots,$ and $x_{k-Q}$ in past N bits and future Q bits with respect to an input signal as a target from the equalizer; a storing unit which stores the deviation $\sigma(S^m_k)$ of the noises for the past and future states; and an input signal arithmetic operating unit which calculates an input signal (channel information) $\Lambda c(y_k|S^m_k)$ of the MAP decoding from the deviation $\sigma(S^m_k)$ stored in the storing unit, wherein a likelihood in the MAP decoding is obtained from this input signal. By using the equalizer having the equalization target at which the noises obtained after the equalization become close to the white noises as mentioned above, a white noise arithmetic operation for obtaining white noise values for the past and future states in which colored noises are converted into white noises by using a correlation and a deviation of the noises for the past and future states becomes unnecessary. Noise parameters which are used for the calculation of the input signal are only the deviation of the noises. A calculation amount is remarkably reduced. A memory use amount is also small. A simple apparatus construction having very high practicality is obtained.

According to the invention, there is similarly provided a simple type information recording and reproducing apparatus for performing a general iterative decoding, comprising: an equalizer having an equalization target at which noises obtained after an equalization become close to white noises; a noise correlation arithmetic operating unit which calculates a deviation $\sigma(S^m_k)$ of noises for past and future states which depend on input signal patterns $x_{k-N}, \ldots,$ and $x_{k-Q}$ in past N bits and future Q bits with respect to an input signal as a target from the equalizer; a storing unit which stores the deviation $\sigma(S^m_k)$ of the noises for the past and future states; and an input signal arithmetic operating unit which calculates an input signal (channel information) $\Lambda c(y_k|S^m_k)$ of the iterative decoding from the deviation $\sigma(S^m_k)$ stored in the storing unit, wherein a likelihood in the iterative decoding is obtained from this input signal.

According to the invention, there is provided an information recording and reproducing apparatus for performing a Maximum A posteriori Probability decoding (MAP decoding), comprising: an equalizer having an equalization target at which noises obtained after an equalization become close to white noises; a noise correlation arithmetic operating unit which calculates a deviation $\sigma(S^m_k)$ of noises for past and future states which depend on input signal patterns $x_{k-N}, \ldots,$ and $x_{k-Q}$ in past N bits and future Q bits with respect to an input signal as a target from the equalizer; a storing unit which stores the deviation $\sigma(S^m_k)$ of the noises for the past and future states; and a sliding window processing unit which divides an input signal series obtained after the equalization into small window series, obtains an input signal (channel information) $\Lambda c(y_k|S^m_k)$ from the deviation $\sigma(S^m_k)$ stored in the storing unit in the order of the window series, and calculates a likelihood. By applying the sliding window method to the invention as mentioned above, a memory area which is used in the decoding process can be further reduced.

According to the invention, there is provided an information recording and reproducing apparatus for performing a general iterative decoding, comprising: an equalizer having an equalization target at which noises obtained after an equalization become close to white noises; a noise correlation arithmetic operating unit which calculates a deviation $\sigma(S^m_k)$ of noises for past and future states which depend on input signal patterns $x_{k-N}, \ldots,$ and $x_{k-Q}$ in past N bits and future Q bits with respect to an input signal as a target from the equalizer; a storing unit which stores the deviation $\sigma(S^m_k)$ of the noises for the past and future states; and a sliding window processing unit which divides an input signal series obtained after the equalization into small window series, obtains an input signal (channel information) $\Lambda c(y_k|S^m_k)$ from the deviation $\sigma(S^m_k)$ stored in the storing unit in the order of the window series, and calculates a likelihood.

According to the invention, there is further provided an information recording and reproducing apparatus for performing a Viterbi decoding, comprising: a noise correlation arithmetic operating unit which calculates a correlation $e(S^m_k)$ and a deviation $\sigma(S^m_k)$ of noises for past and future states which depend on input signal patterns $x_{k-N}, \ldots,$ and $x_{k-Q}$ in past N bits and future Q bits; a storing unit which stores the correlation $e(S^m_k)$ and deviation $\sigma(S^m_k)$ of the noises for the past and future states; a white noise arithmetic operating unit which obtains white noise values $n_k$ for the past and future states in which colored noises are converted into white noises by using the correlation $e(S^m_k)$ and deviation $\sigma(S^m_k)$ of the noises for the past and future states which were stored in the storing unit; and a branch metric calculating unit which calculates a branch metric (channel information) $\Lambda c(y_k|S^m_k)$ of the Viterbi decoding from the white noise values for the past and future states and their deviation $\sigma(S^m_k)$, wherein a likelihood in the Viterbi decoding is obtained from this input signal.

Each of the white noise arithmetic operating units in the MAP decoding, iterative decoding, and Viterbi decoding obtains an equalized waveform mean value of the shortest path whose path metric becomes minimum among all of the paths in past and future intervals k−L−1 to k+M which pass through a path which is shifted from a state $S_{k-1}$ that is one-precedent to the present state to the present state $S_k$ in the past N bits and future Q bits and presumes a white equalization noise value. The information recording and reproducing apparatus of the invention can be also simplified by handling the input signal patterns, as targets, only in the past N bits or the future Q bits. The noise correlation arithmetic operating unit obtains a mean value of the equalized signals for the input signal patterns and obtains the correlation and deviation of the noises which depend on the input signal patterns on the basis of a difference between the equalized waveform and the mean value. Thus, the correlation and deviation of the noises which depend on the accurate input signals can be obtained. In the case where the code with the restriction conditions such as an MTR restriction and the like is magnetically recorded and reproduced, the noise correlation arithmetic operating unit obtains the correlation and deviation of the noises which depend on the input signal patterns by a training using random input signals which are not restricted. Thus, even if the pattern whose appearance probability is suppressed to a low probability by the MTR restriction exists, the number of times of training for effectively obtaining the noise correlation is reduced. By performing the decoding which takes into consideration the MIR restriction, the numbers of states and paths which are required for decoding are reduced, the efficiency is raised, and decoding performance (error rate) can be improved. In the noise correlation arithmetic operating unit, the correlation and deviation of the noises are stored into the storing unit at predetermined off-track intervals of a reproducing head in the direction of a track width, an off-track amount is detected from a change in amplitude value of a preamble part and the correlation and deviation of the noises according to the off-track amount are read out from the storing unit and used for decoding, thereby performing the more accurate decoding. In the noise correlation arithmetic operating unit, the correlation and deviation of the noises are stored into the storing unit every zone, every cylinder, or every sector and used for each decoding, thereby performing the accurate decoding. The noise correlation arithmetic operating unit obtains the correlation and deviation of the noises from a reproduced signal of a training series recorded in a training sector or a training cylinder of the medium, thereby improving training efficiency. The noise correlation arithmetic operating unit obtains the correlation and deviation of the noises stored in the storing unit by correcting them in accordance with the amplitude value of the preamble of each sector of the medium, thereby performing the accurate decoding. The noise correlation arithmetic operating unit further calculates the correlation and deviation of the noises again at certain specific timing and updates the storing unit, thereby realizing an apparatus with durability corresponding to a time-dependent deterioration of the noise parameter.

According to the invention, there is provided an information recording and reproducing method of performing a Maximum A posteriori Probability decoding (MAP decoding), comprising the steps of:

calculating a correlation $e(S^m_k)$ and a deviation $\sigma(S^m_k)$ of noises for past and future states which depend on input signal patterns $x_{k-N}, \ldots,$ and $x_{k-Q}$ in past N bits and future Q bits and storing them;

obtaining white noise values $n_k$ for the past and future states in which colored noises are converted into white noises by using the correlation $e(S^m_k)$ and deviation $\sigma(S^m_k)$ of the noises which were stored; and calculating an input signal (channel information) $\Lambda c(y_k|S^m_k)$ of the MAP decoding from the white noise values and their deviation $\sigma(S^m_k)$ for the past and future states.

According to the invention, there is provided an information recording and reproducing method of performing a general iterative decoding, comprising the steps of:

calculating a correlation $e(S^m_k)$ and a deviation $\sigma(S^m_k)$ of noises for past and future states which depend on input signal patterns $x_{k-N}, \ldots$ and $x_{k-Q}$ in past N bits and future Q bits and storing them;

obtaining white noise values $n_k$ for the past and future states in which colored noises are converted into white noises by using the correlation $e(S^m_k)$ and deviation $\sigma(S^m_k)$ of the noises for the past and future states which were stored; and calculating an input signal (channel information) $\Lambda c(y_k|S^m_k)$ of the iterative decoding from the white noise values for the past and future states and their deviation $\sigma(S^m_k)$.

According to the invention, there is provided an information recording and reproducing method of performing a Maximum A posteriori Probability decoding (MAP decoding), comprising the steps of:

calculating a deviation $\sigma(S^m_k)$ of noises for past and future states which depend on input signal patterns $x_{k-N}, \ldots,$ and $x_{k-Q}$ in past N bits and future Q bits with respect to an equalized signal, as a target, at which noises obtained after an equalization become close to white noises and storing the deviation; and calculating an input signal (channel information) $\Lambda c(y_k|S^m_k)$ of the MAP decoding from the stored deviation $\sigma(S^m_k)$.

According to the invention, there is provided an information recording and reproducing method of performing an iterative decoding, comprising the steps of:

calculating a deviation $\sigma(S^m_k)$ of noises for past and future states which depend on input signal patterns $x_{k-N}, \ldots,$ and $x_{k-Q}$ in past N bits and future Q bits with respect to an equalized signal, as a target, at which noises obtained after an equalization become dose to white noises and storing the deviation; and calculating an input signal (channel information) $\Lambda c(y_k|S^m_k)$ of the iterative decoding from the stored deviation $\sigma(S^m_k)$.

According to the invention, there is provided an information recording and reproducing method of performing a Maximum A posteriori Probability decoding (MAP decoding), comprising the steps of:

calculating a deviation $\sigma(S^m_k)$ of noises for past and future states which depend on input signal patterns $x_{k-N}, \ldots,$ and $x_{k-Q}$ in past N 10 bits and future Q bits with respect to an input signal series, as a target, obtained after an equalization at which noises obtained after the equalization become close to white noises and storing the deviation; and dividing the input signal series obtained after the equalization into small window series, obtaining an input signal (channel information) $\Lambda c(y_k|S^m_k)$ from the stored deviation $\sigma(S^m_k)$ in the order of the window series, and calculating a likelihood while sliding.

According to the invention, there is provided an information recording and reproducing method of performing an iterative decoding, comprising the steps of:

calculating a deviation $\sigma(S^m_k)$ of noises for past and future states which depend on input signal patterns $x_{k-N}, \ldots,$ and $x_{k-Q}$ in past N bits and future Q bits with respect to an equalized signal, as a target, at which noises obtained after the equalization become close to white noises and storing the deviation; and dividing an input signal series obtained after the equalization into small window series, obtaining an input signal (channel information) $\Lambda c(y_k|S^m_k)$ from the stored deviation $\sigma(S^m_k)$ in the order of the window series, and calculating a likelihood while sliding.

According to the invention, there is provided an information recording and reproducing method of performing a Viterbi decoding, comprising the steps of:

calculating a correlation $e(S^m_k)$ and a deviation $\sigma(S^m_k)$ of noises for past and future states which depend on input signal patterns $x_{k-N}, \ldots,$ and $x_{k-Q}$ in past N bits and future Q bits and storing them;

obtaining white noise values $n_k$ for the past and future states in which colored noises are converted into white noises by using the correlation $e(S^m_k)$ and deviation $\sigma(S^m_k)$ of the noises for the past and future states which were stored; and calculating a branch metric (channel information) $\Lambda c(y_k|S^m_k)$ of the Viterbi decoding from the white noise values for the past and future states and their deviation $\sigma(S^m_k)$.

Other features are substantially the same as those in the apparatus construction.

According to the invention, there is further provided a signal decoding circuit, comprising: a noise correlation arithmetic operating unit which calculates a deviation and a correlation of noises for a present state which depend on input signal patterns of the present and past or future; a storing unit which stores the correlation and deviation of the noises; a white noise arithmetic operating unit which obtains white noise values for the input signal patterns in which colored noises are converted into white noises by using the correlation and deviation of the noises which were stored in the storing unit; and an input signal arithmetic operating unit which calculates an input signal of an encoder from the white noise values and the deviation of the white noises.

According to the invention, there is provided a signal decoding circuit comprising: an equalizer having an equalization target at which noises obtained after an equalization become close to white noises; a noise correlation arithmetic operating unit which calculates a deviation of noises for a present time point which depend on input signal patterns of the present and past or future with respect to an input signal from the equalizer; a storing unit which stores the deviation of the noises; and an input signal arithmetic operating unit which calculates an input signal of a decoder from the deviation stored in the storing unit.

According to the invention, there is further provided a signal decoding circuit comprising: an equalizer having an equalization target at which noises obtained after an equalization become close to white noises; a noise correlation arithmetic operating unit which calculates a deviation of noises for a present time point which depend on input signal patterns of the present and past or future with respect to an input signal from the equalizer; a storing unit which stores the deviation of the noises; and a sliding window processing unit which divides an input signal series obtained after the equalization into small window series, obtains an input signal (channel information) from the deviation stored in the storing unit in the order of the window series, and calculates a likelihood.

Other features in the signal decoding circuits are substantially the same as those in the information recording and reproducing apparatuses.

The above and other objects, features, and advantages of the present invention will become more apparent from the following detailed description with reference to the drawings.

BRIEF DESCRIPTION OF THE DRAWINGS

FIG. 9 is an explanatory diagram of a table in which states for a recording signal on a medium and mean values of waveforms obtained after an equalization have been stored and which is used in a decoding of the present invention;

FIG. 11 is an explanatory diagram of a table in which correlations and standard deviations of noises for states of the signal on the medium have been recorded and which is used in the decoding of the invention;

FIG. 15 is a block diagram of data signal recording and reproduction for receiving and decoding the signal and noise parameters for the state of the signal obtained by training;

FIG. 16 is an explanatory diagram of a sliding window method which is applied to the MAP decoding of the invention;

FIG. 18 is an explanatory diagram of states of a PR channel in the case where the EEPR4 is applied to a 16/17 MTR code;

FIG. 20 is an explanatory diagram of a memory table in which correlations and standard deviations of noises for states of the signal on the medium with respect to the PR channel, as a target, in FIG. 19 and mean values of equalized signals have been stored.

DETAILED DESCRIPTION OF THE PREFERRED EMBODIMENTS

Figure 1:
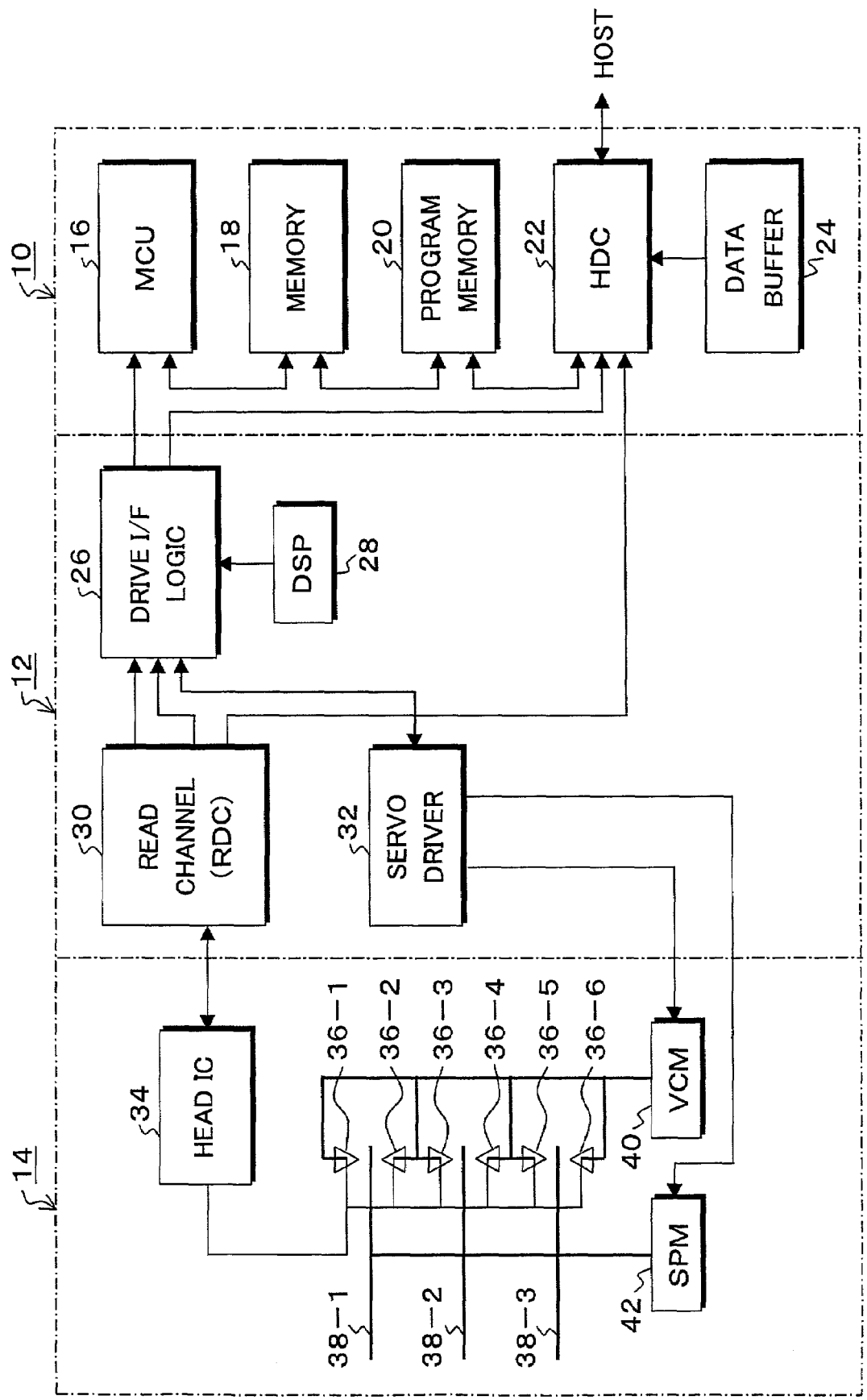
FIG. 1 is a block diagram of a hard disk drive to which the invention is applied.

FIG. 1 is a block diagram of a hard disk drive to which the invention is applied. The hard disk drive comprises an SCSI controller 10, a drive control 12, and a disk enclosure 14. An interface with a host is not limited to the SCSI controller 10 but another proper interface controller can be used. The SCSI controller 10 has: an MCU (main control unit) 16; a memory 18 comprising a DRAM or an SRAM which is used as a control memory; a program memory 20 using a non-volatile memory such as a flash memory or the like for storing a control program; a hard disk controller (HDC) 22; and a data buffer 24. The drive control 12 has: a drive interface logic 26; a DSP 28; a read channel 30; and a servo driver 32. A head IC 34 is further provided for the disk enclosure 14. Combination heads 36-1 to 36-6 each having a recording head and a reproducing head are connected to the head IC 34. The combination heads 36-1 to 36-6 are provided for recording surfaces of magnetic disks 38-1 to 38-3, respectively, and moved to arbitrary track positions of the magnetic disks 38-1 to 38-3 by the driving of a rotary actuator by a VCM 40. The magnetic disks 38-1 to 38-3 are rotated at a predetermined speed by a spindle motor 42.

Figure 2:
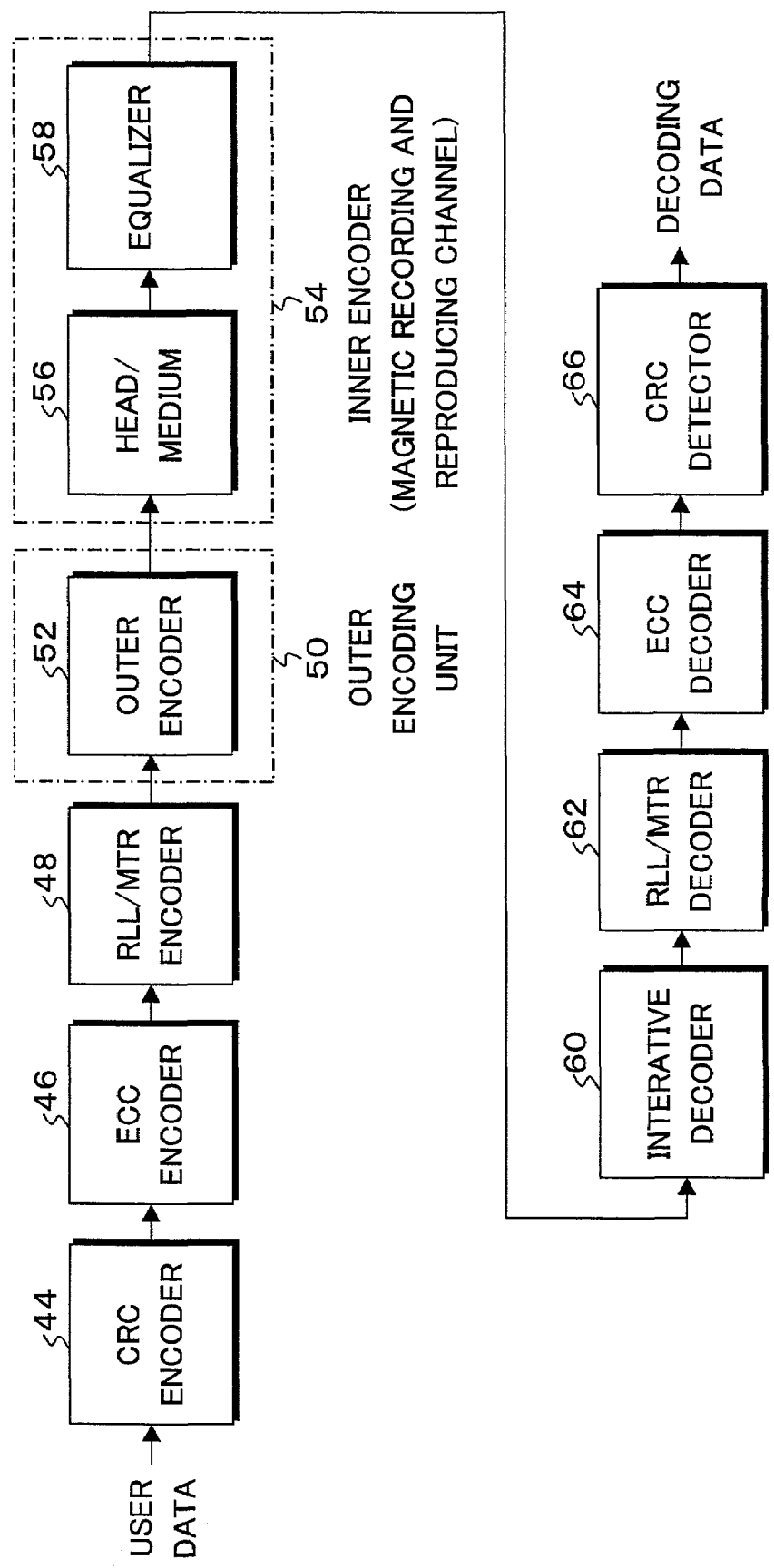
FIG. 2 is a block diagram of a read channel serving as a recording and reproducing system in FIG. 1.

FIG. 2 shows a construction of the read channel 30 in FIG. 1 in case of using an iterative decoding method. User data comprising a binary pattern of "0, 1" is inputted to a CRC (Cyclic Redundancy Check Codes) encoder 44 for error correction and detection and, thereafter, inputted to an ECC (Error Correction Code) encoder 46 for error correction. Subsequently, an output result of the ECC encoder 46 is inputted to an RLL (Run Length Limited) encoder for enabling a timing correction upon reproduction by a PLL (Phase Locked Loop). In this example, since an MTR (Maximum Transition Run) code for limiting a continuous magnetic transition is used in consideration of characteristics of a magnetic recording and reproducing channel, the output result of the ECC encoder 46 is inputted to an RLL/MTR encoder 48. An output result $u_k$ of the RLL/MTR encoder 48 is inputted to an outer encoder 52 of an outer encoding unit 50. An output $x_k$ of the outer encoder 52 is reproduced through a head/medium 56 after completion of the magnetic recording. A reproduced analog signal is shaped through an equalizer 58 so as to have a desired target waveform of PR4, EPR4, EEPR4, MEEPR4, or the like and becomes a channel signal $y_k$. A magnetic recording and reproducing channel 54 comprising the head/medium 56 and equalizer 58 can be regarded as an encoder for converting the output signal $x_k$ of the outer encoder 52 into the output signal $y_k$ of the magnetic recording and reproducing channel 54 and is called an inner encoder 54 here. The analog signal $y_k$ shaped by the equalizer 58 is decoded by an iterative decoder 60 as a decoder for the outer encoder 52 and inner encoder 54, so that final decoding data is obtained through an RLL/MTR decoder 62, an ECC decoder 64, and a CRC detector 66.

Figure 3:
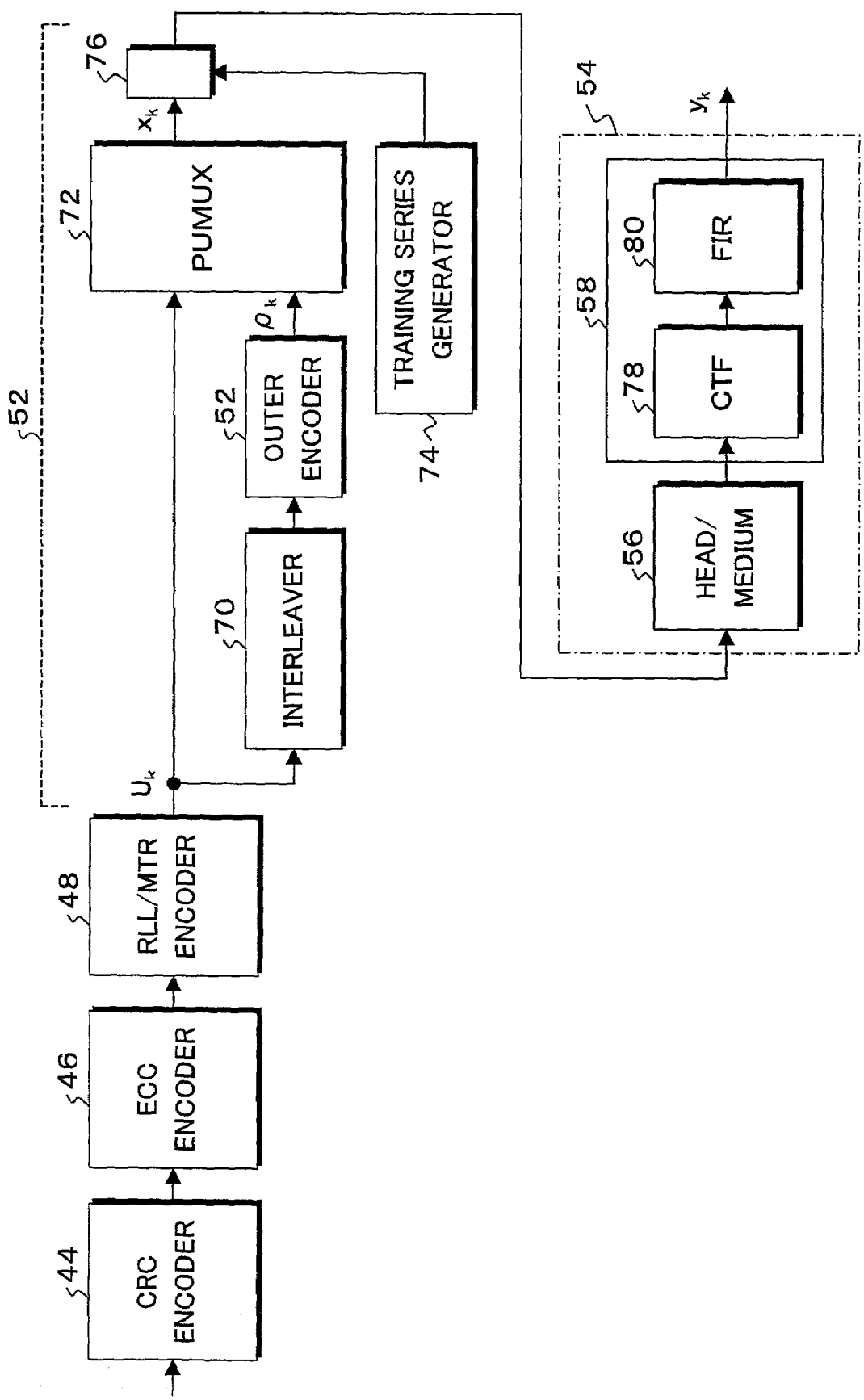
FIG. 3 is a block diagram showing a construction of component elements in a range from a CRC encoder to an inner encoder in FIG. 2.

FIG. 3 shows details of the component elements in a range from the CRC encoder 44 to the inner encoder 54 in the read channel in FIG. 2. A parity for detecting an error correction in the ECC is added to the user data by the CRC encoder 44, a parity for error correction by the Reed Solomon code is added by the ECC encoder 46, and its output result is inputted to the RLL/MTR encoder 48. The output signal $u_k$ from the RLL/MTR encoder 48 is converted into random numbers by an interleaver 70 and its series is inputted to the outer encoder 52. As an outer code which is outputted from the outer encoder 52, it is assumed that a result (digital value) of a binary discrimination (hard decision) of "0, 1" is not outputted as a decoding result but a turbo code, a low density parity check code (LDPC), or the like as a code using an iterative decoding by a soft decision decoder which inputs and outputs a soft decision result (analog value) indicative of likelihood (reliability information) in which a decoding series is equal to "0" or "1" as a prerequisite is used. A PUMUX (Puncturing & Multiplexer) 72 converts an output Pk of the outer encoder 52 corresponding to the output signal $u_k$ of the RLL/MTR encoder 48 into a recording series $x_k$. The PUMUX 72 properly punctures the output $P_k$ of the outer encoder in a manner such that an encoding rate $U_{len}/X_{len}$ indicative of a ratio in the case where the output $u_k$ having a length of $U_{len}$ bits of the RLL/MTR encoder 48 is converted into the output $x_k$ having a length of $X_{len}$ bits of the PUMUX is set to a desired value and, thereafter, multiplexes a resultant output $p_k$ to the output $u_k$ of the outer encoder. The PUMUX output $x_k$ is recorded and reproduced by the head/medium 56. The reproduced waveform is equalized to a desired signal waveform by the equalizer 58 comprising: a CTF (Continuous Time Filter) 78 for suppressing noises by a frequency limitation; and an FIR (Finite Impulse Response) filter 80 for finally waveform-shaping an output of the CTF 78 by a finite delay line and a tap. An output $y_k$ of the FIR filter 80 becomes an inner code series for the output $x_k$ of the PUMUX 72 when the magnetic recording and reproducing channel comprising the head/medium 56, CT filter 78, and FIR filter 80 is regarded as an inner encoder 54.

Figure 4A:
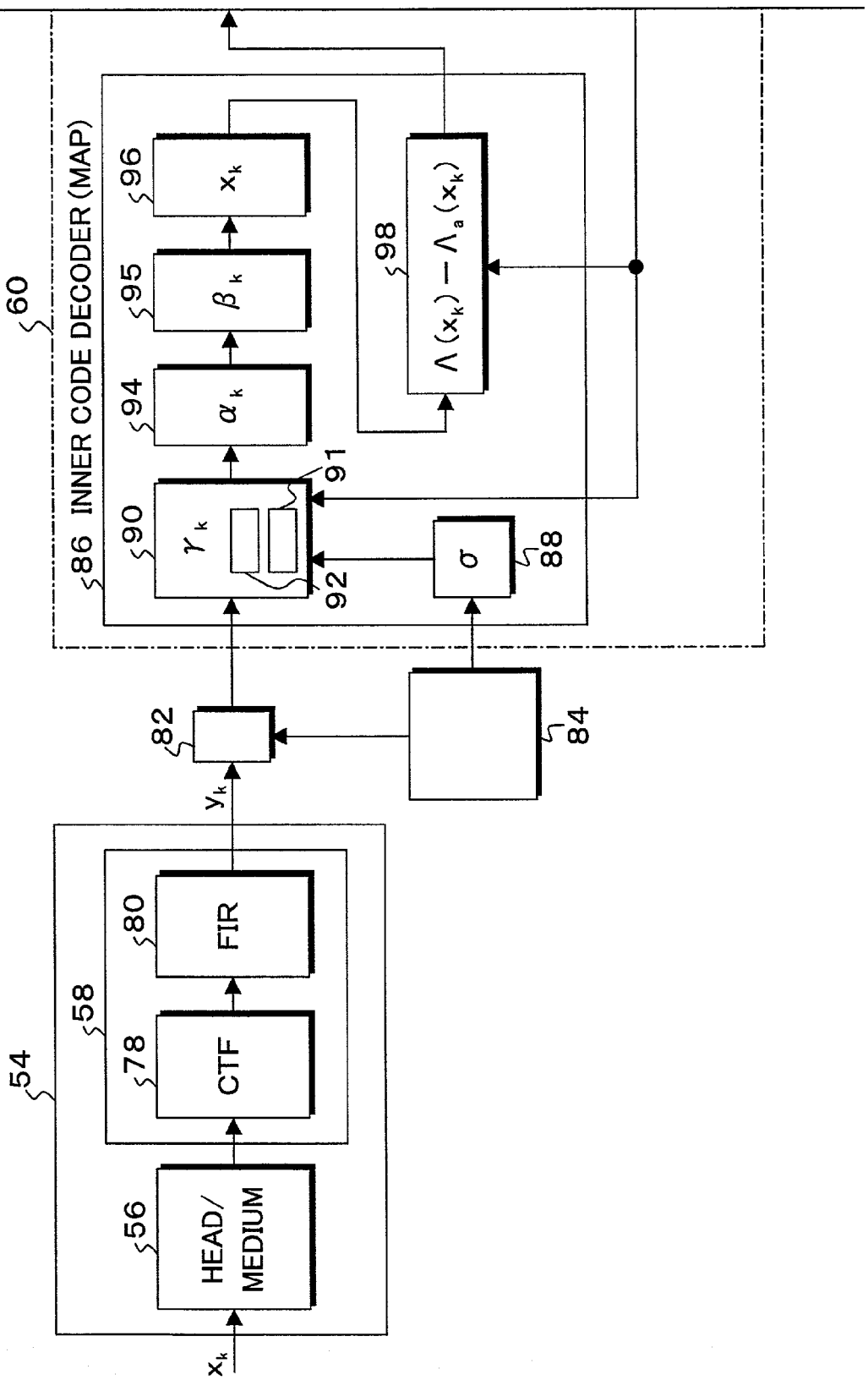
FIGS. 4A and 4B are block diagrams showing a construction of component elements in a range from the inner encoder to a CRC detector in FIG. 2.
Figure 4B:
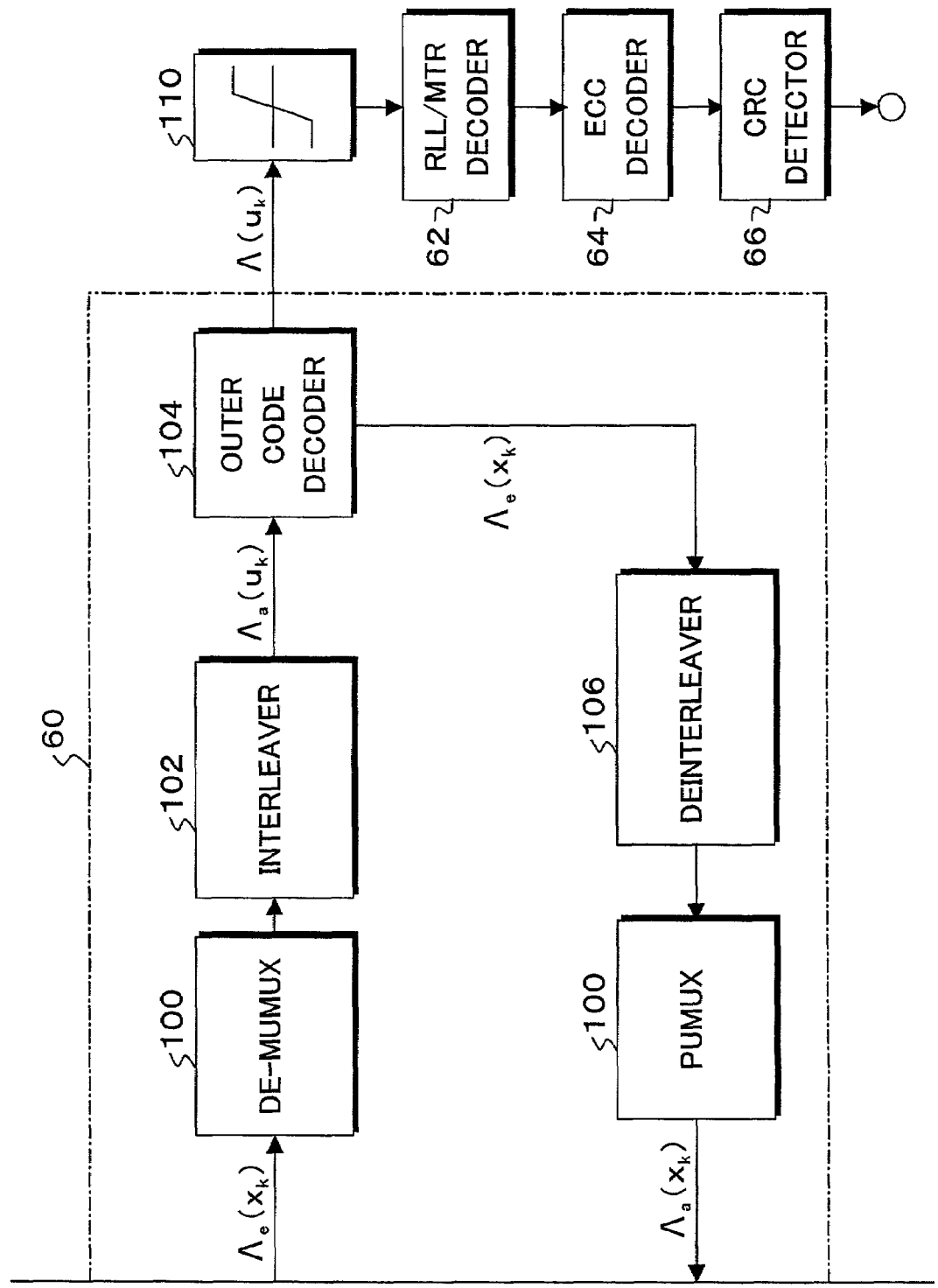

FIGS. 4A and 4B show details of the component elements in a range from the inner encoder 54 to the CRC detector 66 in FIG. 2. The series $x_k$ is converted into the inner code series $y_k$ serving as an output of the equalizer 58 by the inner encoder 54 as a magnetic recording and reproducing channel and sent to an inner code decoder 86 provided in the iterative decoder 60 serving as a decoder for the magnetic recording and reproducing channel. In this example, the inner code decoder 86 is an MAP decoder for performing the MAP decoding. The inner code series $y_k$ passes through the inner encoder 54 as a magnetic recording and reproducing channel, so that it inevitably includes not only signal components but also noise components. A correlation of the noises presumed by a noise correlation arithmetic operating unit 84 by a method, which will be clearly explained hereinlater, and a value of a standard deviation σ of the noises are held into a memory 88 on the inner code decoder 86. In the inner code decoder 86, on the basis of the inner code series $y_k$, the standard deviation σ, and prior information $\Lambda_a(x_k)$ for the recording series $x_k$, the following values of $\gamma_k$, $\alpha_{k-1}$, $\beta_k$, and $\Lambda(x_k)$ are calculated by a Maximum A posteriori Probability algorithm (MAP algorithm): that is, $\gamma_k$ of an arithmetic operating block 90 as a transition probability in a range from a time point k−1 to a time point k in each state on a trellis diagram showing a time transition of a state in the magnetic recording and reproducing channel; $\alpha_{k-1}$ of an arithmetic operating block 94 as a probability in each state in a range from a start point of a trellis to the time point k−1; $\beta_k$ of an arithmetic operating block 95 as a probability in each state in a range from an end point of the trellis to the time point k; and $\Lambda(x_k)$ of an arithmetic operating block 96 as reliability information for each bit which is calculated by products of $\alpha_{k-1}$, $\beta_k$, and $\gamma_k$. External information $\Lambda e(x_k)$ is calculated by subtracting the prior information $\Lambda_a(x_k)$ from the reliability information $\Lambda(x_k)$ of the arithmetic operating block 96 by an arithmetic operating block 98 and this external information becomes an output. The outputted external information $\Lambda e(x_k)$ is transmitted through a DE-PUMUX 100 for performing the operation opposite to that of the PUMUX 72 in FIG. 3 and through an interleaver 102 and inputted to an outer code decoder 104 as prior information $\Lambda_a(u_k)$ for the output series $u_k$ of the RLL/MTR encoder. After the outer code is decoded by the outer code decoder 104, unless proper iterative finishing conditions are satisfied, external information $\Lambda e(u_k)$ for the output series $u_k$ of the RLL/MTR encoder is transmitted through a deinterleaver 106 for performing the operation opposite to that of the interleaver 70 in FIG. 3 and through a PUMUX 108 and sent to the inner code decoder 86 as prior information $\Lambda_a(x_k)$ for the recording series $x_k$. The iterative decoder 60 iteratively calculates the reliability information among a plurality of decoders as mentioned above, thereby raising a decoding precision. With respect to the iterative decoder, there is the paper of Z. Wu, "Coding and Iterative Detection for Magnetic Recording Channels", Kluwer Academic Publishers, 2000. In the iterative calculating step in the iterative decoder 60, unless the proper iterative finishing conditions are satisfied in the outer code decoder 104, the reliability information $\zeta(u_k)$ for the output series $u_k$ of the RLL/MTR encoder is sent to a hard decision block 110 and a binary value of "0, 1" is discriminated. A binary discriminated result is sent to the RLL/MTR decoder 62. An error correction is performed to the decoding result by the ECC decoder 64. The error correction is finally inspected by the CRC detector 66 and the user data is obtained.

Figures 5, 6:
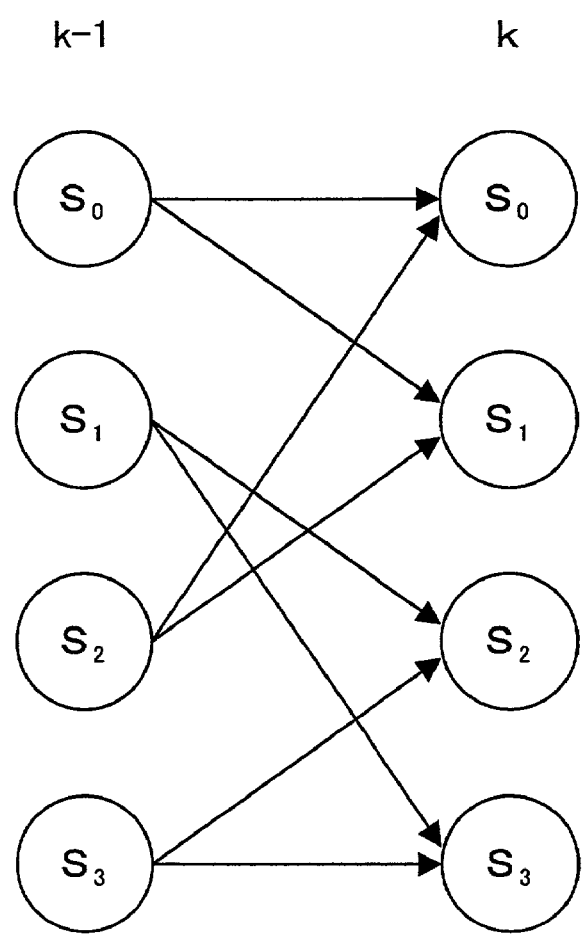
FIG. 5 is an explanatory diagram of states in a PR4 channel.
FIG. 6 is an explanatory diagram of a state transition in the PR4 channel.

Subsequently, a procedure for a BCJR (Bahl-Cocke-Jeinek-Raviv) decoding method which is executed in the inner code decoder 86 serving as an MAP decoder for the magnetic recording and reproducing channel in FIGS. 4A and 4B will be described. It is now assumed that the magnetic recording and reproducing channel as an inner encoder 54 in FIG. 4A for the recording series $x_k$ is the PR channel, for example, PR4 channel. Assuming that each state of the PR4 channel is defined as shown in FIG. 5, a state transition diagram showing a transition for the time in each state is as shown in FIG. 6. Now, assuming that noises $n_k$ in the PR4 channel have a Gaussian distribution whose mean value is equal to 0 and whose variance is $\sigma^2$ and an ideal equalization value at the time when the state is shifted from the state at the time point k-1 to the state at the time point k is expressed by $d_{\{s_{k-1} \to s_k\}}$, a probability density function of the noises $n_k$ is expressed by the following equation (1).

$$p(n_k) = \frac{1}{\sqrt{2\pi}\,\sigma}\exp\left(-\frac{n_k^2}{2\sigma^2}\right) = \frac{1}{\sqrt{2\pi}\,\sigma}\exp\left(-\frac{(y_k - d_{\{s_{k-1} \to s_k\}})^2}{2\sigma^2}\right) \quad (1)$$

By multiplying $(2\pi)^{1/2}\sigma$ to both sides of the equation (1) and obtaining its natural logarithm, channel information $\Lambda c(y_k)$ is obtained as shown by the following equation (2).

$$\Lambda_c(y_k) = -\frac{(y_k - d_{\{s_{k-1} \to s_k\}})^2}{2\sigma^2} \quad (2)$$

Figure 7:
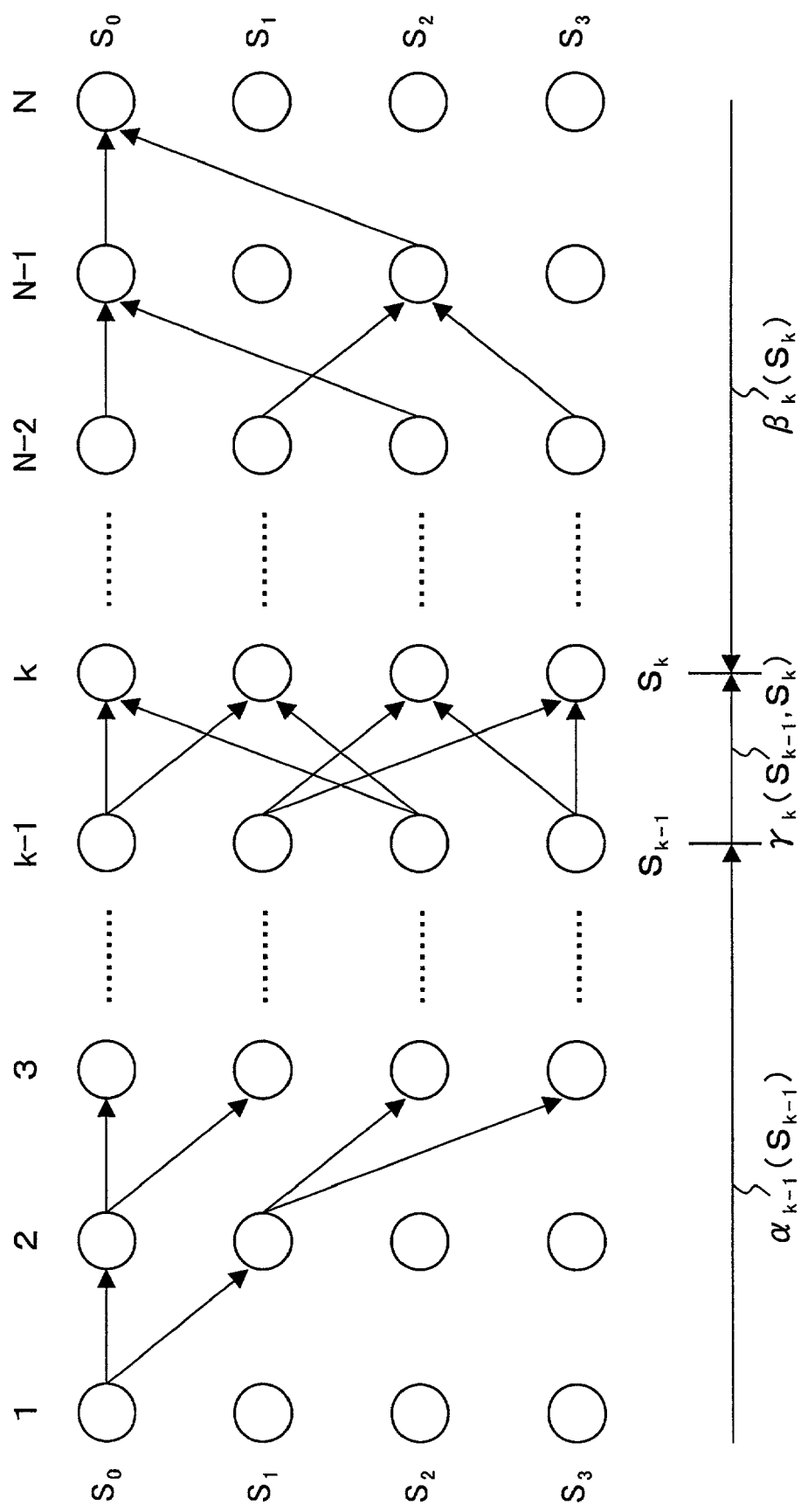
FIG. 7 is an explanatory diagram of a calculating method of $\alpha$, $\beta$, and $\gamma$ in a Maximum A posteriori Probability decoding method (MAP decoding method)

The MAP decoding for the PR4 channel is executed as shown in FIG. 7 from the prior information $\Lambda_a(x_k)$ for the channel information $\Lambda c(y_k)$ and recording series $x_k$.

Where, $\gamma_k(S_{k-1}, S_k)$: probability at which the state is shifted from each state at the time point k−1 to each state at the time point k $\alpha_{k-1}(S_{k-1})$: probability at which the state is shifted from start point of the trellis to each state at the time point k−1

$\beta_k(S_k)$: probability at which the state is traced back from the end point of the trellis to each state at the time point k Those probabilities can be expressed by the following equations (3) to (5), respectively.

$$\gamma_k(S_{k-1},S_k)=\exp\{x_k\Lambda_a(x_k)\}\exp\{\Lambda_c(y_k)\} \quad (3)$$

$$\alpha_k(s_k) = \sum_{s_{k-1}} \alpha_{k-1}(s_{k-1})\gamma_k(s_{k-1}, s_k) \quad (4)$$

$$\beta_{k-1}(s_{k-1}) = \sum_{s_k} \beta_k(s_k)\gamma_k(s_{k-1}, s_k) \quad (5)$$

Assuming that an initial state and an end state are a state $S_0$, end point conditions are as follows.

$$\alpha_0(s_0) = \begin{cases} 1, & \text{if } s_0 = S_0 \\ 0, & \text{if } s_0 \neq S_0 \end{cases} \quad (6)$$

$$\beta_N(s_N) = \begin{cases} 1, & \text{if } s_N = S_0 \\ 0, & \text{if } s_N \neq S_0 \end{cases}$$

The reliability information $\Lambda(x_k)$ which is expressed by a natural logarithm (logarithm likelihood ratio) of a ratio of a posteriori probability at which $x_k$ at the time point k is equal to "1" and a posteriori probability at which it is equal to "O" is obtained by the following equation (7).

$$\Lambda(x_k) = \ln \frac{\sum_{(s_{k-1},s_k), x_k=1} \alpha_{k-1}(s_{k-1}) \gamma_k(s_{k-1}, s_k) \beta_k(s_k)}{\sum_{(s_{k-1},s_k), x_k=0} \alpha_{k-1}(s_{k-1}) \gamma_k(s_{k-1}, s_k) \beta_k(s_k)} \quad (7)$$

where, ($S_{k-1}$, $S_k$), $x_k=1$: all of the state transitions concerned with $x_k=1$ ($S_{k-1}$, $S_k$), $x_k=0$: all of the state transitions concerned with $x_k=0$ From the equation (7), the external information $\Lambda e(x_k)$ is obtained by subtracting the prior information $\Lambda_a(x_k)$ as shown by the arithmetic operating block 98 in FIGS. 4A and 4B. The inner code decoder 86 in FIGS. 4A and 4B outputs the external information $\Lambda_e(x_k)$.

$$\Lambda_e(x_k) = \Lambda(x_k) - \Lambda_a(x_k) \quad (8)$$

Figure 8:
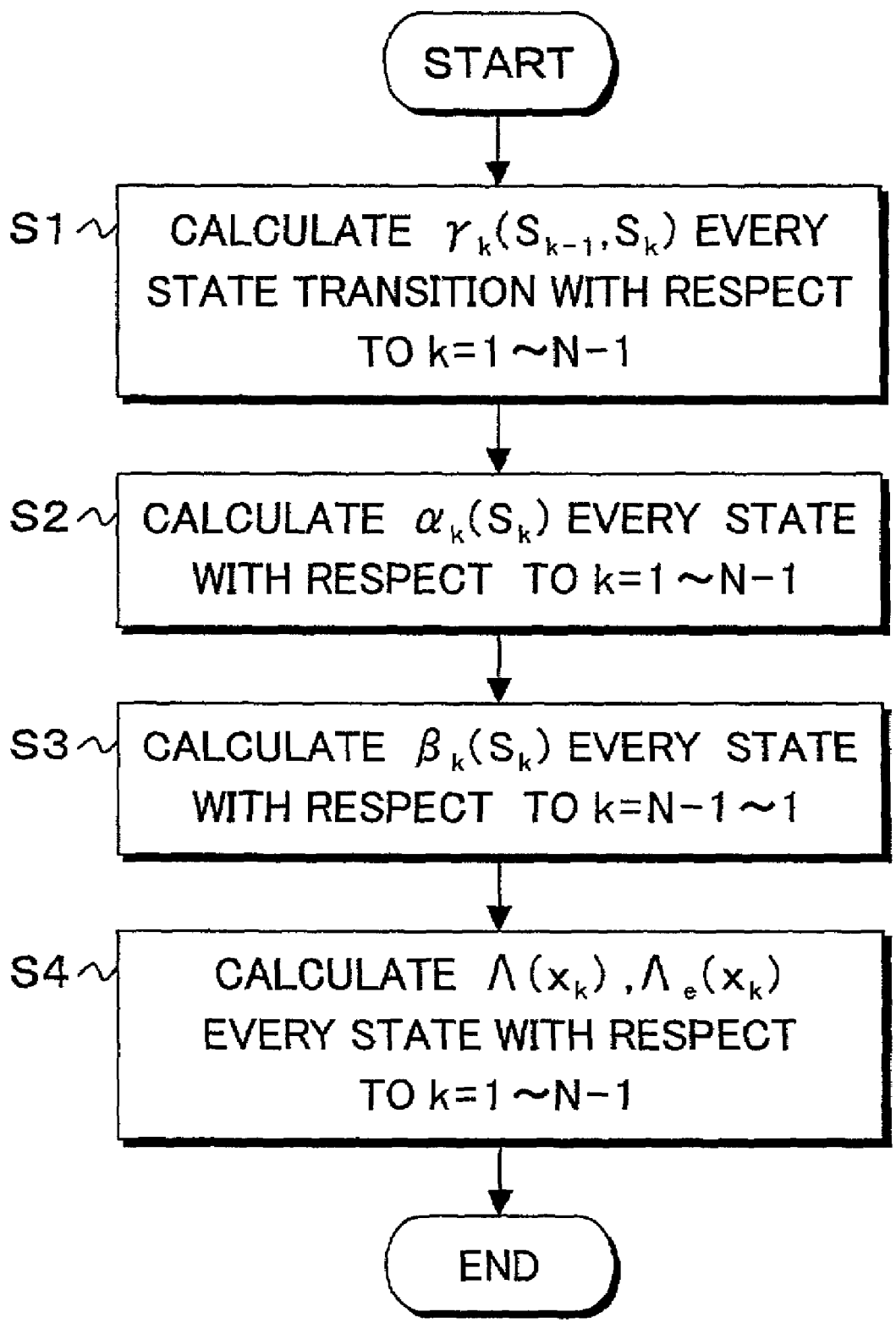
FIG. 8 is a flowchart for a calculating procedure in the MAP decoding method.

FIG. 8 is a flowchart for a procedure of the calculations in the BCJR decoding algorithm. First, in step S1, $\gamma_k(S_{k-1}, S_k)$ is calculated on the basis of the equations (2) and (3). Subsequently, in step S2, $\alpha_k(S_k)$ is obtained on the basis of the equation (4). In step S3, $\beta_k(S_k)$ is obtained on the basis of the equation (5). Finally, in step S4, $\Lambda(x_k)$ and $\Lambda e(x_k)$ are obtained on the basis of the equations (7) and (8). A LogMAP decoding method of calculating the BCJR decoding method in a logarithm area has also been proposed in order to reduce a calculation amount. According to the LogMAP decoding method, although the equations (3) to (7) are replaced with the following equations (9) to (13), a calculating procedure is similar to that in the BCJR decoding method.

$$\gamma_k(S_{k-1}, S_k) = x_k \Lambda_a(x_k) + \Lambda_c(y_k) \quad (9)$$

$$\alpha_k(s_k) = \max_{s_{k-1}} * [\alpha_{k-1}(s_{k-1}) + \gamma_k(s_{k-1}, s_k)] \quad (10)$$

$$\beta_{k-1}(s_{k-1}) = \max_{s_{k-1}} * [\beta_k(s_k) + \gamma_k(s_{k-1}, s_k)] \quad (11)$$

$$\alpha_0(s_0) = \begin{cases} 0, & \text{if } s_0 = S_0 \\ -\infty, & \text{if } s_0 \neq S_0 \end{cases} \quad (12)$$

$$\beta_N(s_N) = \begin{cases} 0, & \text{if } s_N = S_0 \\ -\infty, & \text{if } s_N \neq S_0 \end{cases}$$

$$\Lambda(x_k) = \max_{(s_{k-1},s_k), x_k=1} * [\alpha_{k-1}(s_{k-1}) + \gamma_k(s_{k-1}, s_k) + \beta_k(s_k)] - \max_{(s_{k-1},s_k), x_k=0} * [\alpha_{k-1}(s_{k-1}) + \gamma_k(s_{k-1}, s_k) + \beta_k(s_k)] \quad (13)$$

where, $$\max *(a,b) = \max(a,b) + \ln\{1 + \exp(-|b-a|)\} \quad (14)$$

Further, an Max-LogMAP decoding method of further reducing the calculation amount by approximating the equation (14) to the following equation (15) has also been proposed.

$$\max *(a,b) \approx \max(a,b) \quad (15)$$

A similar effect can be also obtained in case of using an SOVA (Soft Output Viterbi Algorithm) decoding method. The SOVA decoding method is obtained by expanding the Viterbi decoding method so as to execute a soft output. In principle, it is the SISO decoding method of the same soft-input and soft-output as the BCJR decoding method. A difference between the BCJR decoding method and the SOVA decoding method is as follows. In case of the BCJR decoding method, the posteriori probability is obtained in consideration of all of the possible paths (series of the state transition). However, in case of the SOVA decoding method, the posteriori probability is obtained only from partial paths. Therefore, according to the SOVA decoding method, although performance is inferior to that of the BCJR decoding method, a calculation amount is small. Although a selecting method of the path differs, since the SOVA decoding method is the same SISO decoding method in principle, a calculation of the path metric for each state transition is based on the same equations (3) and (4) or equations (9) and (10) as those in the BCJR decoding method. Therefore, equations (25) and (26) according to the invention can be applied as they are. With respect to the SOVA decoding method, there are the paper of J. Hagenauer and P. Hoeher, "A Viterbi algorithm with soft-decision outputs and its applications", IEEE Globe Com, pp. 1680–86, 1989, and the like.

However, the conventional MAP decoder for performing the calculations of the equations (2) to (8) is constructed on the assumption that the channel noises $n_k$ are the white noises having no correlation among the noises as shown by the equation (1) as a prerequisite, and even if it is applied to the actual channel having a correlation among the noises, sufficient performance cannot be obtained. The conventional MAP decoder cannot be ignored more and more in accordance with an increase in recording density. Nothing is considered with respect to an influence by non-linear factors such as PE (Partial Erasure), NLTS (Non Linear Transition Shift), and the like which depend on the recording signal patterns on the medium. In order to cope with the increase in recording density in the future magnetic recording apparatus, such a conventional MAP decoder is fairly insufficient. In the first embodiment of the invention, in order to cope with a deterioration of the performance due to the non-linear factors such as PE, NLTS, and the like which depend on the recording signal patterns on the medium, $2^{N+Q+1}$ states $S^m_0$ to $S^m_{2^{(N+Q+1)}-1}$ corresponding to binary recording signals $x_{k-N}, \ldots, x_k, \ldots,$ and $x_{k+Q}$ of past N bits and future Q bits are defined as shown in a table of FIG. 9, thereby allowing the signals and noise parameters to have the recording signal state dependency. Mean values $d(S^m_0)$ to $d(S^m_{2^{(N+Q+1)}-1})$ of a waveform $y_k$ obtained after the equalization in the invention for the states $S^m_0$ to $S^m_{2^{(N+Q+1)}-1}$ are obtained as shown in FIG. 9 by the noise correlation arithmetic operating unit 84 in FIGS. 4A and 4B by using the training series. An arithmetic operation of the noise correlation using the training series is realized by a training series generator 74, selectors 76 and 82, and the noise correlation arithmetic operating unit 84 in FIGS. 3, 4A, and 4B and this point will be clarified in the following explanation. In FIG. 4B, by considering the recording signal dependency only in the future by setting N=0 or only in the past by setting Q=0, the number of training times, a mean value calculating time, and a memory for storing the recording signal state dependency in FIG. 4B can be reduced. In the first embodiment, it is assumed that the output noises $n_k$ of the equalizer at the time point k are derived by the following equation (16).

$$n_k = y_k - d(S^m_k) \quad (16)$$

where, $S^m_k$: state which is determined from FIG. 9 at the time point k In order to simplify the apparatus, an ideal equalized waveform for the state $S^m_k$ can be also used in place of $d(S^m_k)$.

Figure 10A:
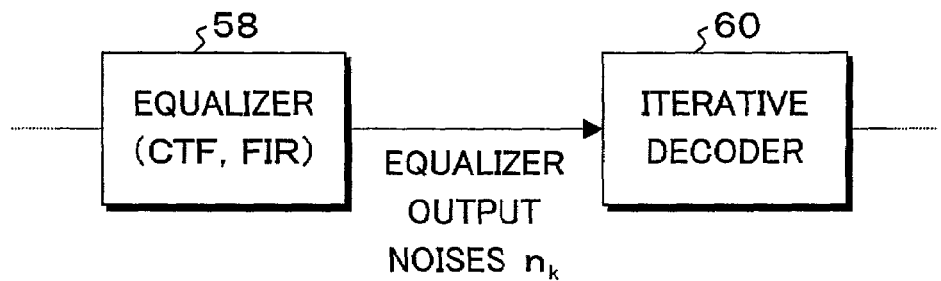
FIGS. 10A to 10C are explanatory diagrams of noise models which are used in a decoding step of the invention.
Figure 10B:
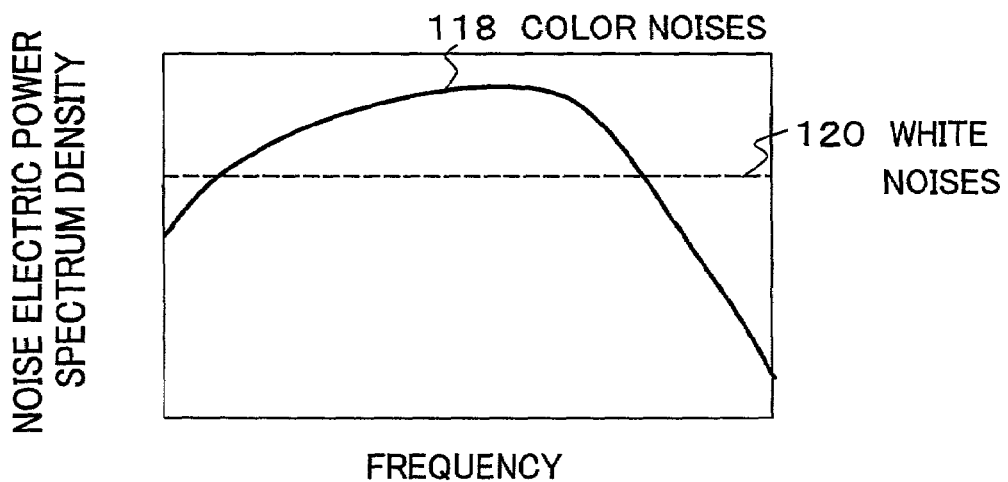
Figure 10C:
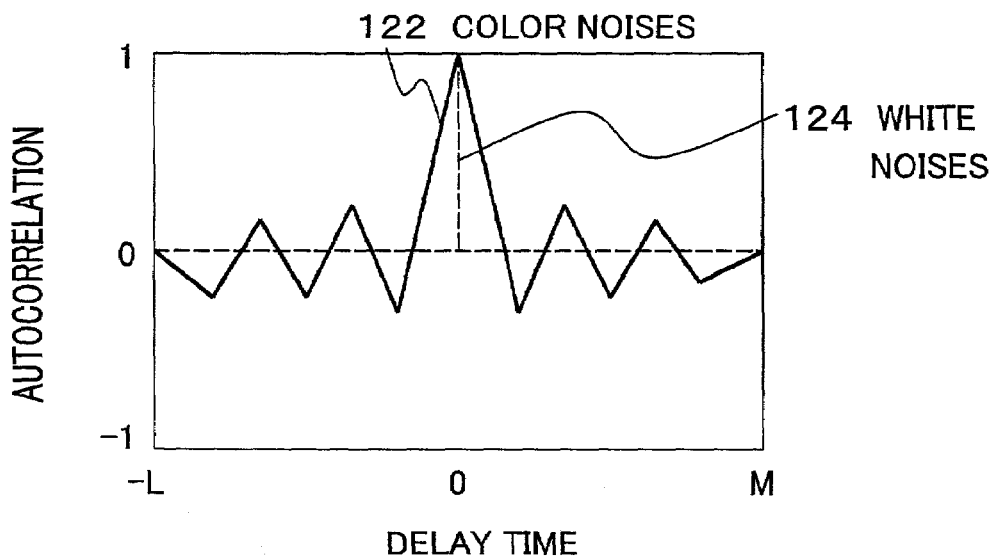

FIGS. 10A to 10C are explanatory diagrams of noise models. The output noises $n_k$ in the equalizer 58 in FIG. 10A obtained from the equation (16) are the colored noises having the frequency dependency as shown by a frequency spectrum 118 as shown in FIG. 10B. It is assumed that on a time base of FIG. 10C, they have an autocorrelation 122 of a Gauss-Markov chain having a correlation with the noises of past L bits and future M bits. The white Gaussian noises have an autocorrelation 124 with a frequency spectrum 120 shown by a broken line. In this instance, the output noises $n_k$ are obtained by the following equation (17).

$$n_k = w_k + \sum_{i=-L}^{-1} e_i(s_k^m) n_{k-i} + \sum_{i=1}^{M} e_i(s_k^m) n_{k-i} \quad (17)$$

where, $e_{-L}(S^m_k) \sim e_{-1}(S^m_k)$: weights at the present time point of the noises of the past L bits which depend on the recording state ($S^m_k$)

$e_1(S^m_k) \sim e_M(S^m_k)$: weights at the present time point of the noises of the future M bits which depend on the recording state ($S^m_k$)

$w_k$: white Gaussian noises which are added at the present time point

Since $w_k$ is not concerned with $n_{k-L}, \ldots, n_{k-1}, n_{k+1}, \ldots, n_{k+L}$, as $e_{-L}(S^m_k), \ldots, e_{-1}(S^m_k), e_1(S^m_k), \ldots,$ and $e_M(S^m_k)$, it is suff value such that a variance $$\sigma^2(s_k^m) = \left\langle \left( n_k - \sum_{i=-L}^{-1} e_i(s_k^m) n_{k-i} - \sum_{i=1}^{M} e_i(s_k^m) n_{k-i} \right)^2 \right\rangle \quad (18)$$

where, < >: expected value of $w_k$ becomes minimum.

Therefore, assuming that an expected value of an autocorrelation function of $n_k$ for the state $S^m_k$ is set to $R_{nn}(j|S^m_k) = <n_k n_{k+j}|S^m_k>$(where, $-L \leq j \leq M$), it is sufficient that the following equation (19) is satisfied according to the method of Minimum Mean Square Error.

$$\left\langle n_{k-j} \left( n_k - \sum_{i=-L}^{M} e_i(s_k^m) n_{k-i} \right) \right\rangle = \quad (19)$$

$$R_{nn}(j|s_k^m) - \sum_{i=-L}^{M} e_i(s_k^m) R_{nn}(j-i|s_k^m) = 0$$

$$(-M \leq i, j \leq L, i \neq 0, j \neq 0)$$

Therefore, assuming that a (L+M+1)×(L+M+1) covariance matrix of $n_k$ is set to $R_{i,j}(S^m_k)=[R_{nn}(j-i|S^m_k)]$ (where, $1 \leq i, j \leq M+1$), a matrix $R_{\backslash L+1}(S^m_k)$ obtained by excluding the components of the (L+1) row and the (L+1) column is expressed as follows.

$$R_{\backslash L+1}(s_k^m) = \quad (20)$$

-continued $$\begin{bmatrix} R_{i,j(1 \leq i \leq L, 1 \leq j \leq L)}(s_k^m) & R_{i,j(1 \leq i \leq L, L+2 \leq j \leq L+M+1)}(s_k^m) \\ R_{i,j(L+2 \leq i \leq L+M+1, 1 \leq j \leq L)}(s_k^m) & R_{i,j(L+2 \leq i \leq L+M+1, L+2 \leq j \leq L+M+1)}(s_k^m) \end{bmatrix}$$

It is assumed that $e(S^m_k)=\{e_{-L}(S^m_k), \ldots, e_{-1}(S^m_k), e_1(S^m_k), \ldots, e_m(S^m_k)\}$ and $r(S^m_k)=\{R_{nn}(-L|S^m_k), \ldots, R_{nn}(-1|S^m_k), R_{nn}(1|S^m_k), \ldots, R_{nn}(m|S^m_k)\}^T$, $e(S^m_k)$ is obtained by the following equation (21).

$$e(s_k^m) = R_{\backslash L+1}^{-1}(s_k^m) r(s_k^m) \quad (21)$$

A variance $\sigma^2(S^m_k)$ of the white Gaussian noises $w_k$ at this time is obtained by the following equation (22).

$$\sigma^2(s_k^m) = R_{nn}(0|s_k^m) - r^T(s_k^m) R_{\backslash L+1}^{-1}(s_k^m) r(s_k^m) \quad (22)$$

In the first embodiment, in order to raise a decoding precision, in the calculation of the channel information $\Lambda_c(y_k)$ in the equation (2), an NPMAP (Noise Predictive Maximum A posteriori Probability) decoding method which introduces a correlation for the past and future noises which depend on the recording patterns is executed.

Assuming that $e(S^m_k)$ and $\sigma(S_k)$ which are obtained by the equations (21) and (22) depend on the state $S^m_k$ in FIG. 9 like a correlation and a standard deviation of the noises for the state of the signal on the medium shown in a table of FIG. 11, by using the table of FIG. 11 in the calculation of the channel information $\Lambda_c(y_k)$, the NPMAP decoding method of the recording signal depending type can be realized. Now, assuming that the input noises of the MAP decoder are based on the Markov chain having a correlation with the noises of the past L bits and future M bits, its probability density function is obtained by the following equation (23) for the equation (1) which presumes the white noises without a correlation.

$$p(n_k | n_{k-L}, \ldots, n_{k-1}, n_{k+1}, \ldots, n_{k+M}) = \quad (23)$$

$$\frac{1}{\sqrt{2\pi} \, \sigma(s_k^m)} \exp\left( -\frac{\left( n_k - \sum_{i=-L}^{-1} e_i(s_k^m) n_{k-i} - \sum_{i=1}^{M} e_i(s_k^m) n_{k-i} \right)^2}{2\sigma^2(s_k^m)} \right)$$

By multiplying $(2\pi)^{1/2}$ to the right side of the equation (23) and obtaining its natural logarithm, the channel information $\zeta_c(y_k S^m_k)$ depending on the recording signal in the MAP decoding is obtained as shown by the following equation (24).

$$\Lambda_c(y_k | s_k^m) = -\ln\sigma(s_k^m) - \frac{\left( n_k - \sum_{i=-L}^{-1} e_i(s_k^m) n_{k-i} - \sum_{i=1}^{M} e_i(s_k^m) n_{k-i} \right)^2}{2\sigma^2(s_k^m)} \quad (24)$$

To calculate the equation (24), it is necessary to presume the noises in the past L bits and future M bits. For this purpose, all of the path metrics in the interval from (k−L−1) to (k+M) which pass through the path which is shifted from the state $S_{k-1}$ to the state $S_k$ of the PR channel are calculated and the path whose value becomes minimum is obtained.

Figure 12:
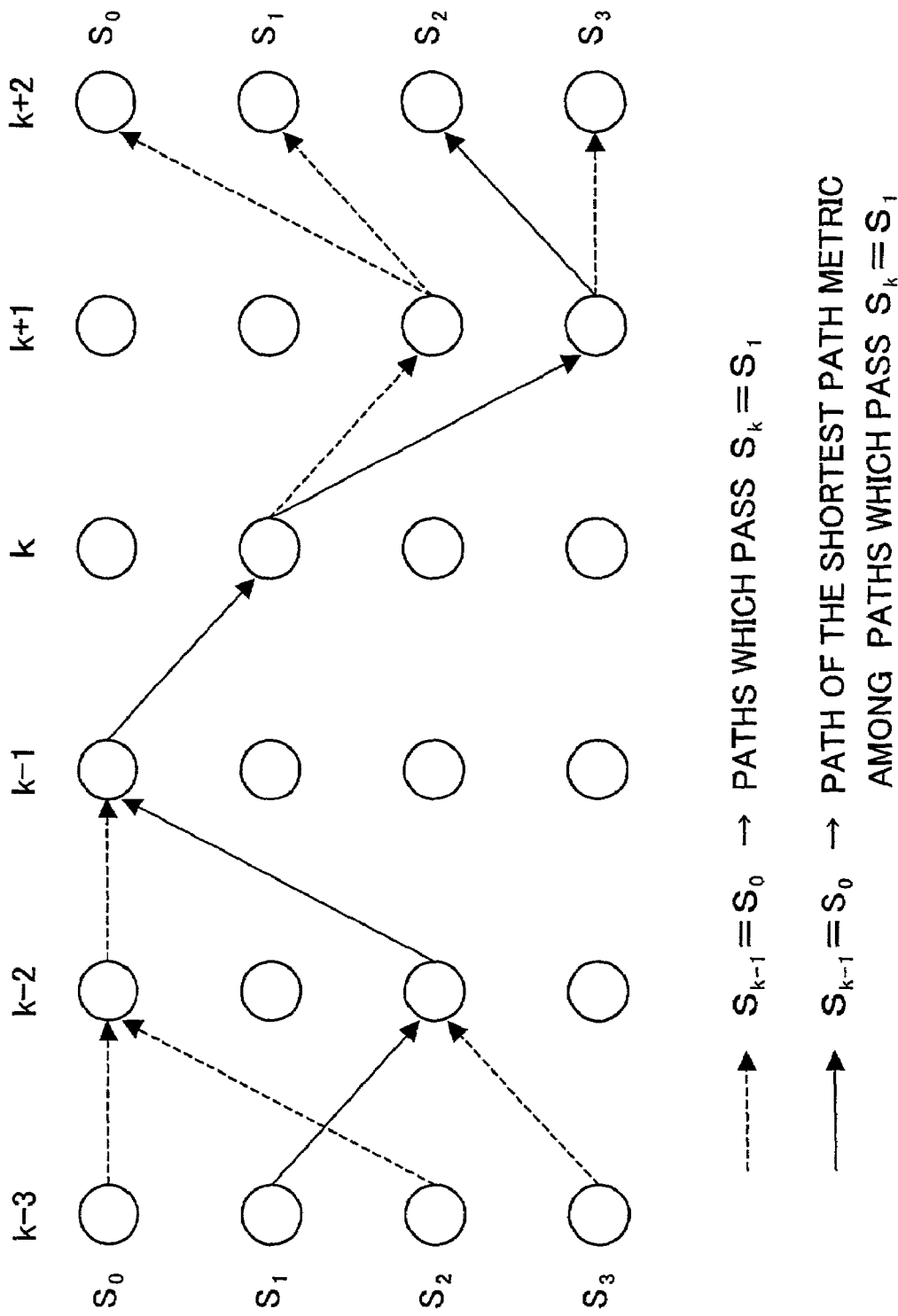
FIG. 12 is an explanatory diagram of a selection example of the shortest path in a Noise Predictive Maximum A posteriori Probability decoding method (NPMAP decoding method) of the invention.

FIG. 12 shows a specific example in the case where in the PR4 channel, it is assumed that the past L bits=2 bits and the future M bits=2 bits, all of the path metrics in the interval from (k−3) to (k+2) which pass through the path which is shifted from the state So to the state $S_1$ are calculated and the path whose value becomes minimum is obtained. It is assumed that mean values $d(S^m_{k-L-1})$ to $d(S^m_{k+M})$ of an equalized waveform corresponding to the shortest path are obtained and the noises $n_k$ obtained after the equalization are presumed by the equation (16). Therefore, the equation (24) is rewritten as follows.

$$\Lambda_c(y_k \mid s_k^m) = -\ln\sigma(s_k^m) - \frac{\left(y_k - d(s_k^m) - \sum_{i=-L}^{-1} e_i(s_k^m)(y_{k+i} - d(s_{k+i}^m)) - \sum_{i=1}^{M} e_i(s_k^m)(y_{k+i} - d(s_{k+i}^m))\right)^2}{2\sigma^2(s_k^m)} \quad (25)$$

Figure 13:
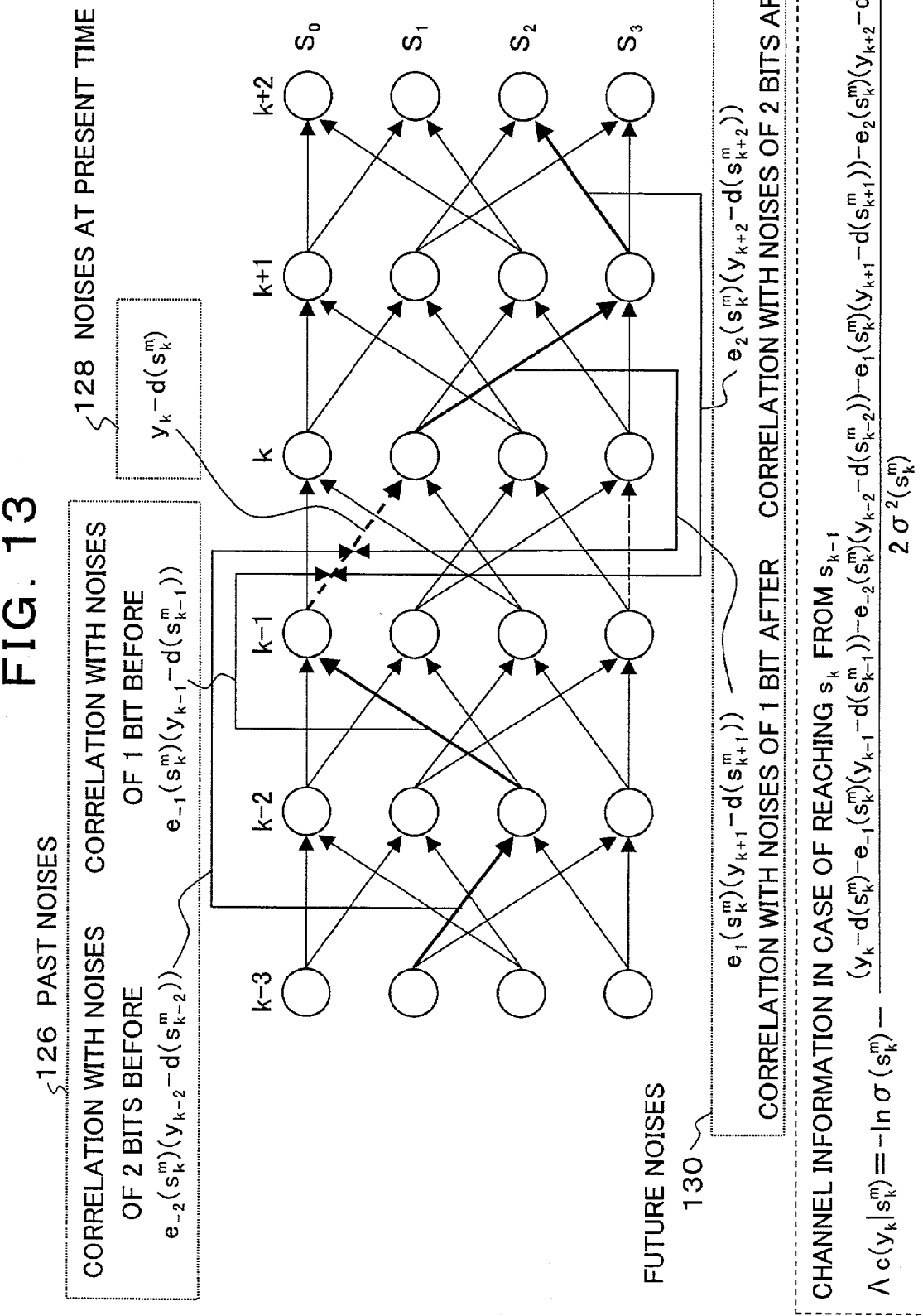
FIG. 13 is an explanatory diagram of a calculation example of channel information of a state in the NPMAP decoding method of the invention.

FIG. 13 shows a specific calculation example of the channel information $\zeta_c(y_k|S^m_k)$ of the state based on the equation (25) in the NPMAP decoding in the case where the past L bits=2 bits and the future M bits=2 bits in the PR4 channel. An arithmetic operation of the channel information by the equation (25) is executed by a white noise arithmetic operating unit 91 and an input signal arithmetic operating unit 92 built in the arithmetic operating block 90 in FIGS. 4A and 4B. That is, the white noise arithmetic operating unit 91 obtains the colored noises having the frequency spectrum 118 in FIG. 10B as white noise values for the past and future states converted into the white noises of the frequency spectrum 120 by using the correlation $e(S^m_k)$ and deviation $\sigma(S^m_k)$ of the noises in the table of FIG. 11 stored in the storing unit 88. The input signal arithmetic operating unit 92 calculates the channel information $\Lambda_c(y_k|S^m_k)$ of the equation (25) from the white noise values for the past and future states and their deviation $\sigma(S^m_k)$ and, thereafter, obtains a likelihood in the MAP decoding from this channel. As a method of presuming the mean values $d(S^m_{k-L-1})$ to $d(S^m_{k+M})$ in the equation (25), the equations (4) and (5) or the equations (10) and (11) as $\alpha$ and $\beta$ in the MAP decoding in FIG. 7 can be also used instead of the shortest path selecting method as shown in FIG. 12, or a decoding result obtained by repetitively performing the decoding a proper number of times can be also used. To simplify the apparatus, an ideal equalized waveform for the state $S^m_k$ can be also used in place of $d(S^m_{k-L-1})$ to $d(S^m_{k+M})$, or the first term of the right side of the equation (25) can be also omitted. By considering the noise correlation only in the future by setting L=0 or only in the past by setting M=0, the number of training times, a noise parameter calculating time, and a memory for storing the table of the noise parameters for the signal state in FIG. 12 can be reduced. By using the channel information $\Lambda_c(y_k)$ obtained from the equation (25) and applying it to the equations (3) to (7) or to the equations (9) to (13) in case of calculating in the logarithm area, the MAP decoding can be realized.

Figure 14:
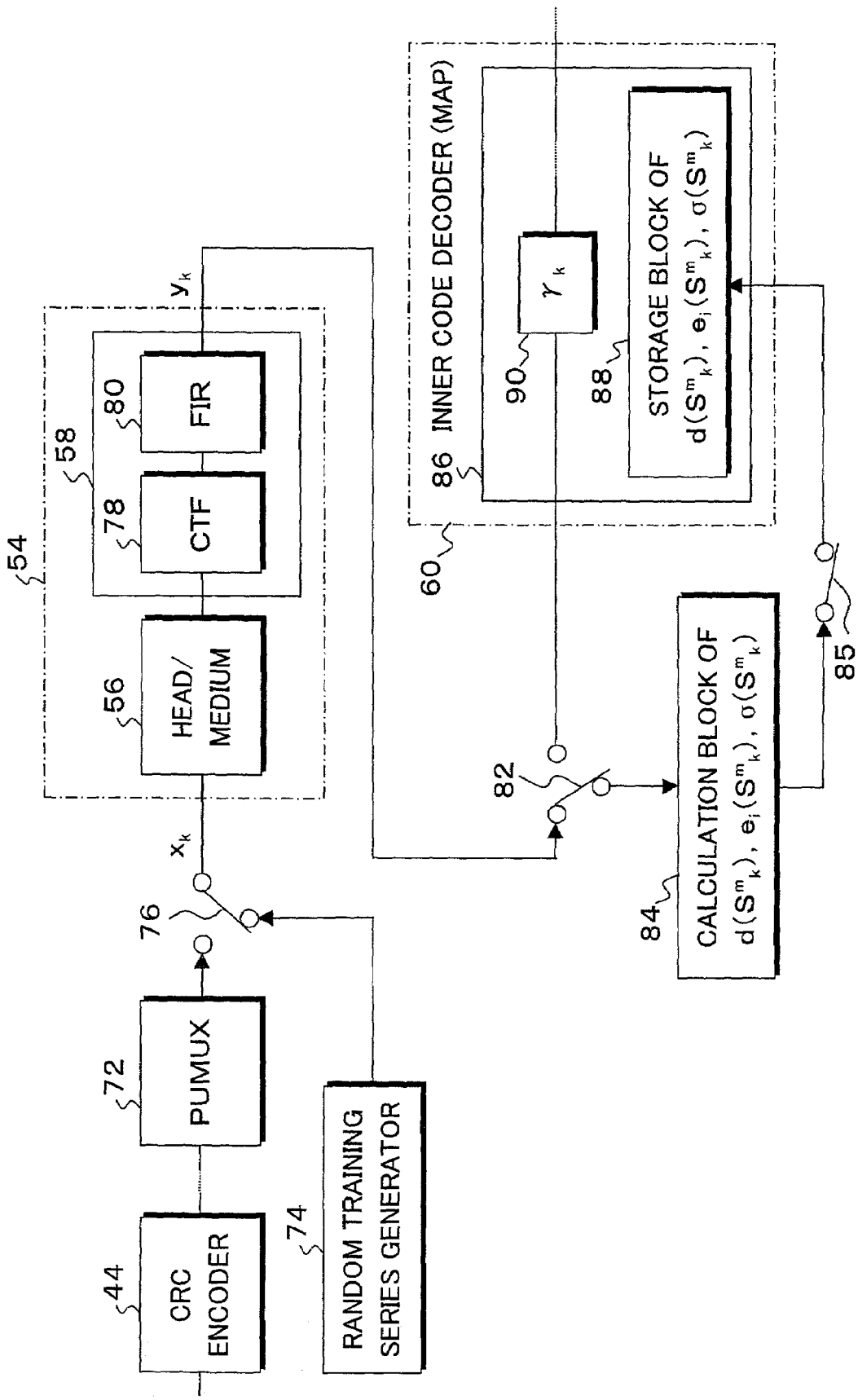
FIG. 14 is a block diagram of a training function for obtaining a signal of a state and noise parameters according to the recording and reproduction of a training signal.

FIG. 14 shows a training function for obtaining the noise parameters for the signal state due to the recording or reproduction of the training signal in the first embodiment. During the recording or reproduction of a training series, the encoding by the series starting from the CRC encoder 44 and reaching the PUMUX 72 is not performed but the random training series generated by the training series generator 74 is recorded or reproduced by the head/medium 56 by the switching of the selector 76 and shaped into a desired equalized waveform by the equalizer 58 comprising the CT filter 78 and FIR filter 80. The equalized waveform from the equalizer 58 is sent to the noise correlation arithmetic operating unit 84 by the switching of the selector 82. A table of the mean value $d(S^m_k)$ of the waveform obtained after the equalization in FIG. 9 is formed from the mean value of the equalized waveform. $e(S^m_k)$ and $\sigma(S^m_k)$ are calculated from the mean value $d(S^m_k)$ by the equations (16) to (22), thereby completing the table of the noise parameters for the signal state in FIG. 11. By dosing a switch 85, the tables of FIGS. 9 and 11 are held in the memory 88.

FIG. 15 shows recording and reproducing states of the data series obtained after completion of the training. During the recording or reproduction of this data series, the training series generator 74 is disconnected by the selector 76, the encoding is performed to the user data series in the processing step starting from the CRC encoder 44 and reaching the PUMUX 72, the encoded data series is recorded or reproduced by the head/medium 56, and it is shaped into a desired equalized waveform by the equalizer 58 comprising the CT filter 78 and FIR filter 80. In the reproducing step, the noise correlation arithmetic operating unit 84 is disconnected by the selector 82 and the equalized waveform is sent to the iterative decoder 60. In the inner code decoder 86 (MAP decoder for the magnetic recording and reproducing channel) corresponding to the first stage of the iterative decoder 60, the channel information is obtained by the equation (25) with reference to the prior information $\Lambda_a(x_k)$ as an output of the PUMUX 108 in FIGS. 4A and 4B and the tables of FIGS. 9 and 11 held in the memory 88. After that, the MAP decoding is executed.

The second embodiment of the invention will now be described. In the first embodiment of the invention, the noises obtained after the equalization have been modeled to the colored noises with the correlation like a frequency spectrum 118 and an autocorrelation 122 in FIGS. 10A to 10C. However, by selecting the equalizer 58 having an equalization target such that the noises obtained after the equalization become close to the white noises without a correlation, the noises obtained after the equalization can be modeled to the white noises. At this time, the PR channel information $\Lambda_c(y_k|S^m_k)$ is obtained by the following equation (26).

$$\Lambda_c(y_k \mid s_k^m) = -\ln\sigma(s_k^m) - \frac{(y_k - d(s_k^m))^2}{2\sigma^2(s_k^m)} \quad (26)$$

By using the channel information $\Lambda_c(y_k)$ obtained from the equation (26) and applying it to the equations (3) to (7) or to the equations (9) to (13) in case of calculating in the logarithm area, the MAP decoding can be realized. According to the second embodiment, the noise parameter is only the standard deviation $\sigma(S_k)$ depending on the recording signal and there is no need to presume the signals $d(S^m_{k-L-1})$ to $d(S^m_{k+M})$ of the past L bits and future M bits as compared with the equation (25). Therefore, the calculation amount is remarkably reduced and the processing speed of the apparatus can be remarkably raised. Since the noise parameter which has to be held in the memory of the apparatus is also only the standard deviation $\sigma(S^m_k)$ depending on the recording signal, the memory capacity can be reduced. Further, in the second embodiment, in the equation (26), the ideal equalized waveform for the state $S^m_k$ can be also used in place of $d(S^m_{k-L-1})$ to $d(S^m_{k+m})$ or the first term of the right side can be also omitted, so that the apparatus can be further simplified.

The third embodiment of the invention will now be described. In the second embodiment, in case of executing the MAP decoding using the standard deviation depending on the recording signal, the reduction of the memory capacity of the apparatus can be realized by using the sliding window method. According to the sliding window method, in the inner code decoder 86 in FIGS. 4A and 4B, first, the received series $y_k$ of a series length $N_s$ is divided into series, that is, windows of a small series length $N_u$. By calculating the reliability information for the divided series of the series length $N_u$ in accordance with the equations (26) and (3) to (7), respectively, the memory to store $\alpha(x_k)$, $\beta(x_k)$, $\gamma(x_k)$, and $\Lambda(x_k)$ in the MAP decoding, that is, the arithmetic operating blocks 90, 94, 95, and 96 in FIGS. 4A and 4B can be reduced and a decoding delay can be shortened. The series of a series length $N_j$ just subsequent to the divided windows of the series length $N_u$ is used as a training series for enabling the calculation of $\beta$ in the equation (5) to be reliable. The number of divided windows is as follows.

$$N_{wind} = [(N_s - N_t)/N_u]$$

Figure 17A:
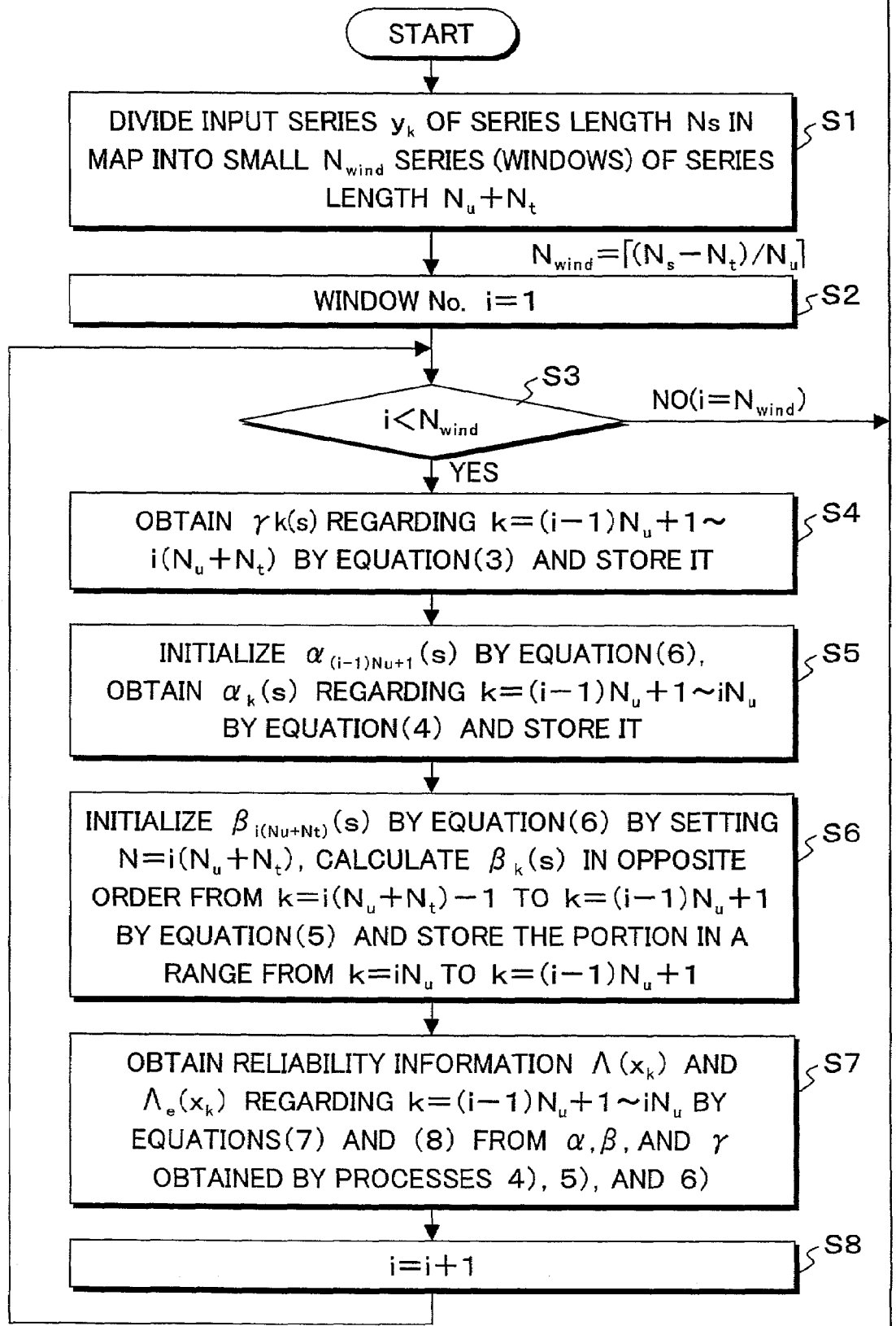
FIGS. 17A and 17B are flowcharts for the MAP decoding of the invention using the sliding window method.
Figure 17B:
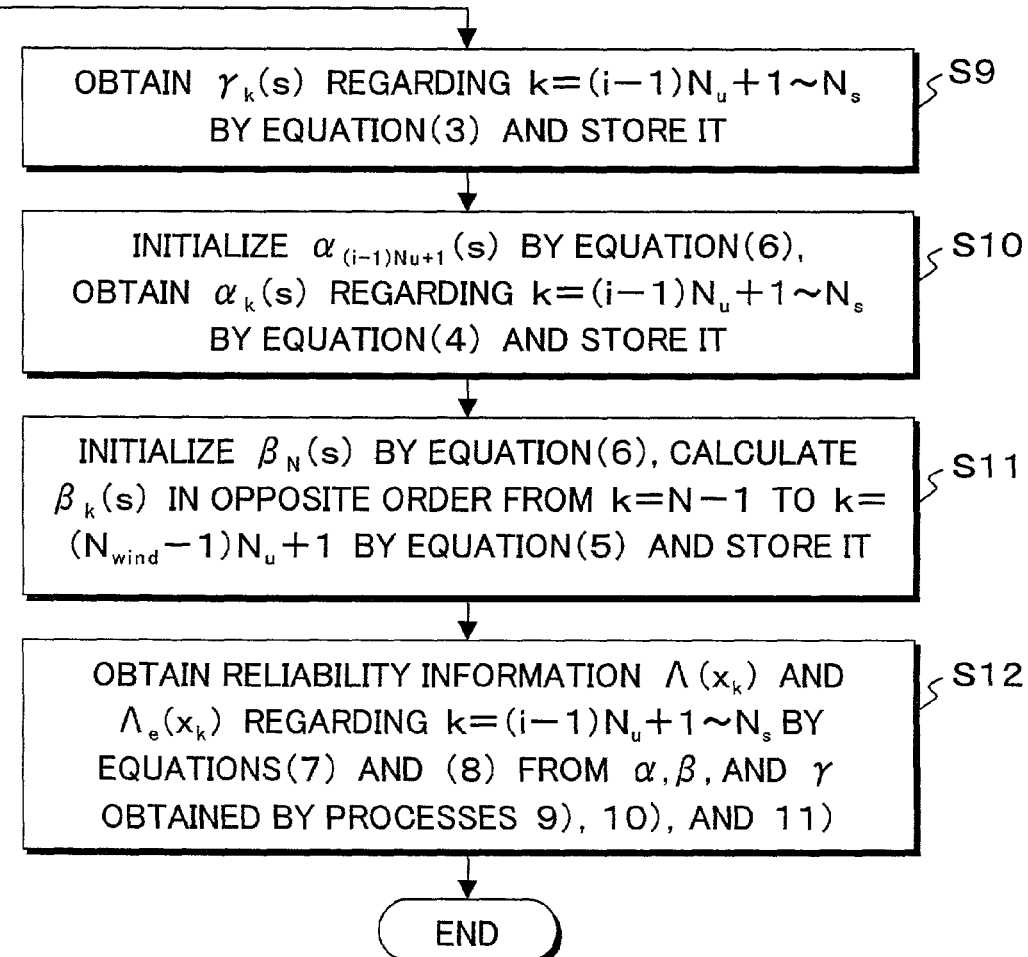

The sliding window method will be specifically explained with reference to FIG. 16. First, in a first window 132-1, reliability information $\Lambda_1, \ldots,$ and $\Lambda_{Nu}$ for the series $y_1, \ldots,$ and $y_{Nu}$ are obtained from the equations (26) and (3) to (7). However, the training series $y_{Nu+1}, \ldots,$ and $y_{Nu+Nt}$ are used in the calculation of $\beta_{Nu}$. In an ith wndow 132-i, $\beta_{iNu}$ is similarly calculated by using the training series $y_{iNu+1}, \ldots,$ and $y_{iNu+Nt}$ and reliability information $\Lambda_{(i-1)Nu+1}, \ldots,$ and $\Lambda_{iNu}$ are obtained. In a last $(N_{wind})$th window 132-N, reliability information $\Lambda_{(Nwind-1)Nu+1}, \ldots,$ and $\Lambda_N$ are obtained from the equations (26) and (3) to (7) by using series $y_{(Nwind-1)Nu+1}, \ldots,$ and $y_N$. Details in case of calculating the reliability information by using the sliding window method in the third embodiment are as shown in flowcharts of FIGS. 17A and 17B. That is, in step S1, the input series is divided into windows as small series. In step S2, the window number is set to 1. After that, processes in steps S3 to S8 are repeated until the window number reaches $N_{wind}-1$, thereby obtaining reliability information. When the window number reaches $N_{wind}$ in step S3, reliability information is obtained in steps S9 to S12. With respect to the sliding window method, there are the paper, S. Benedetto, D. Divsalar, G. Montorsi, and F. Pollara, "Soft-output decoding algorithms in iterative decoding of turbo codes", JPL TDA Progress Report, Vol. 42–124, Feb. 15, 1996, the paper, "MAP decoder for convolutional codes", IEEE J. Select. Areas Commun., Vol. 16, pp. 260–264, February, 1998, and the like.

The fourth embodiment of the invention will now be described. According to the fourth embodiment of the invention, by using the shortest path selecting method as shown in FIG. 12, even in the Viterbi decoding, a Noise Predictive Maximum Likelihood (NPML) decoding method using not only a correlation for the past noises but also a correlation for the future noises is realized. A branch metric calculating equation in the NPML decoding method is the same as the equation (25). That is, according to the fourth embodiment, an information recording and reproducing apparatus for performing the Viterbi decoding comprises: a noise correlation arithmetic operating unit which calculates a correlation and a deviation of noises for past and future states which depend on input signal patterns in the past and future; a storing unit which stores the correlation and deviation of the noises for the past and future states; a white noise arithmetic operating unit which obtains white noise values for the past and future states in which colored noises are converted into white noises by using the correlation and deviation of the noises for the past and future states which were stored in the storing unit; and an input signal calculating unit which calculates an input signal of the Viterbi decoding from the white noise values for the past and future states and the deviation.

The fifth embodiment of the invention will now be described. In the first embodiment of the invention, when the MTR (Maximum Transition Run) codes are used as RLL codes, there is a case where the states in FIGS. 5, 9, and 11 are lost or the paths on the trellis are limited in dependence on the restriction conditions of the MTR codes or the partial response PR. In the fifth embodiment, therefore, in consideration of the loss of the states or the limitation of the paths on the trellis, the efficient training of $d(S^m_k)$, $e(S^m_k)$, and $\sigma(S^m_k)$ is performed, thereby performing the efficient decoding.

Figure 19:
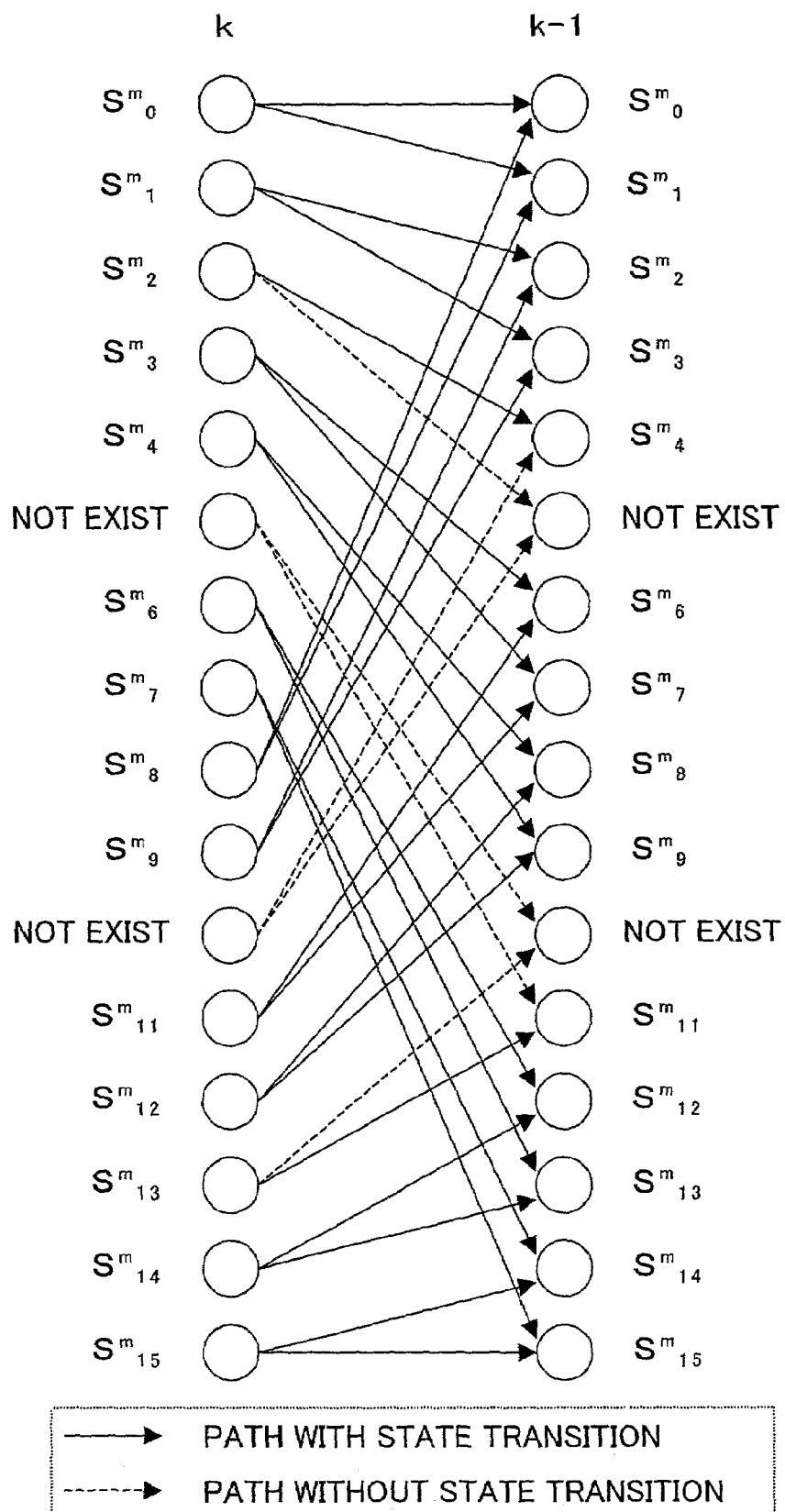
FIG. 19 is an explanatory diagram of a state transition of the PR channel in the case where the EEPR4 is applied to the 16/17 MTR code.

FIG. 18 shows states in the PR channel in case of applying EEPR4 to the 16/17 MTR codes in which the magnetic transition of four continuous times or more is inhibited. It is assumed that the past L bits=3 and the future Q bits=0. In this case, states corresponding to "0101" and "1010" as NRZ codes do not exist due to the restriction conditions of the MTR codes. FIG. 19 shows a state transition of EEPR4. In the case where there is no restriction condition, the number of paths which perform the state transition is equal to 32. On the other hand, if the restriction conditions exist, since six paths shown by broken lines are lost, the number of paths which perform the state transition can be reduced to 26. Therefore, the memory capacity and the calculation amount which are necessary in the inner code decoder 86 in FIGS. 4A and 4B can be reduced.

Further, as shown in FIG. 20, in the fifth embodiment, the tables regarding the mean value $d(S^m_k)$ of the equalized signal for the states which are used in the NPMAP decoding, the correlation $e(S^m_k)$ of the noises, and the standard deviation $\sigma(S^m_k)$ of the noises can be likewise reduced. Therefore, the memory capacity and the calculation amount which are necessary in the iterative decoder 60 can be reduced. In addition, the training for calculating the parameter in FIG. 20 can be also simplified.

According to the sixth embodiment of the invention, the mean value $d(S^m_k)$ of the equalized signal for the states, the correlation $e(S^m_k)$ of the noises, and the standard deviation $\sigma(S^m_k)$ of the noises are held at arbitrary off-track intervals in the track width direction, the off-track amount is detected from a change in amplitude value of the preamble at the head of the sector, and the NPMAP decoding is performed by applying the correlation $e(S^m_k)$ of the noises according to the off-track amount and the standard deviation $\sigma(S^m_k)$ of the noises. Specifically speaking, if the amplitude value of the preamble decreases and the off-track amount is increased, the mean value $d(S^m_k)$ of the equalized signal for the states is decreased in accordance with the off-track amount and the correlation $e(S^m_k)$ of the noises and the standard deviation $\sigma(S^m_k)$ of the noises are increased. Therefore, even if the reproducing head is off-tracked, the decoding of a high precision can be performed.

According to the seventh embodiment of the invention, the mean value $d(S^m_k)$ of the equalized signal for the states, the correlation $e(S^m_k)$ of the noises, and the standard deviation $\sigma(S^m_k)$ of the noises are stored every zone, every cylinder, or every sector of the disk medium and applied to each decoding. Therefore, the accurate decoding can be performed in accordance with the medium position.

According to the eighth embodiment of the invention, by providing the dedicated training sector or training cylinder for recording or reproducing the training series for obtaining the mean value $d(S^m_k)$ of the equalized signal for the states, the correlation $e(S^m_k)$ of the noises, and the standard deviation $\sigma(S^m_k)$ of the noises, training efficiency is improved.

According to the ninth embodiment of the invention, the mean value $d(S^m_k)$ of the equalized signal for the states which have been calculated once, the correlation $e(S^m_k)$ of the noises, and the standard deviation $\sigma(S^m_k)$ of the noises are corrected by using the amplitude value of the preamble of each sector in a manner similar to the case of the off-track, so that the decoding of a higher precision can be performed.

According to the tenth embodiment of the invention, the mean value $d(S^m_k)$ of the equalized signal for the states, the correlation $e(S^m_k)$ of the noises, and the standard deviation $\sigma(S^m_k)$ of the noises are calculated again by using the training series at certain specific timing such as timing upon fluctuation of a temperature in the apparatus, timing in the elapsed time from the activation of the apparatus, timing upon occurrence of errors, or the like, stored, and applied to the decoding, so that the apparatus having high durability which can cope with the time-dependent deterioration can be realized.

As mentioned above, according to the invention, a colored noise model of the Gauss-Markov type having the correlation depending on the past and future input signal patterns is presumed as a noise model that is peculiar to the magnetic recording and reproducing apparatus, and by applying the characteristics of the noise model by a method of high calculating efficiency as much as possible, the decoding performance (error rate performance) can be improved. According to the invention, in the iterative decoding method such as an MAP decoding method or the like, the colored noise model is expressed by the Gaussian type and by using the accurate correlation value (deviation) having the input signal dependency, the decoding performance can be improved. Also in the Viterbi decoding method, by accurately considering the input signal pattern dependency, for the correlation of the past and future noises, the decoding characteristics can be improved. Further, since the input signal pattern dependency for the correlation of the past and future noises is obtained by the training and used in the decoding, the optimum decoding adapted to each state of the apparatus can be dynamically performed.

The invention is not limited to the foregoing embodiments but incorporates many proper modifications without losing the objects and advantages of the invention. The invention is not limited by the numerical values disclosed in the embodiments.

What is claimed is:

1. An information recording and reproducing apparatus comprising:
   a noise correlation arithmetic operating unit which calculates a deviation of noises and a correlation of the noises for a present state which depend on input signal patterns of the present state and past or future states by training;
   a storing unit which stores said correlation and deviation of said noises;
   a white noise arithmetic operating unit which obtains white noise values for said input signal patterns in which colored noises are converted into white noises by using said correlation and deviation of the noises which were stored in said storing unit; and
   an input signal arithmetic operating unit which calculates an input signal of a decoder from said white noise values and a deviation of the white noises,
   the present state referencing an input signal being processed at present, the past state denoting a first input signal series which is time-precedent to the present state input signal pattern, the future state denoting a second input signal series which is time-subsequent to the present state input signal pattern.

2. An apparatus according to claim 1, wherein said decoder performs an MAP (Maximum A posteriori Probability) decoding or a Viterbi decoding as an iterative decoding.

3. An apparatus according to claim 1, wherein said white noise arithmetic operating unit obtains an equalized waveform mean value of a shortest path whose path metric is minimum among all of paths in past and future intervals which pass through a path which is shifted from a state that is one-precedent to the present state, to the present state, and presumes white equalization noise values.

4. An apparatus according to claim 1, wherein said noise correlation arithmetic operating unit processes the input signal patterns of only the past or future states as targets.

5. An apparatus according to claim 1, wherein said noise correlation arithmetic operating unit obtains a mean value of equalized signals for the input signal patterns and obtains the correlation and deviation of the noises which depend on the input signal patterns on the basis of a difference between an equalized waveform and said mean value.

6. An apparatus according to claim 1, wherein in case of magnetically recording and reproducing a code with restriction conditions such as an MTR restriction, said noise correlation arithmetic operating unit obtains the correlation and deviation of the noises which depend on the input signal patterns by training using random input signals without a restriction.

7. An apparatus according to claim 1, wherein said noise correlation arithmetic operating unit stores said correlation and deviation of the noises into said storing unit at predetermined off-track intervals of a reproducing head in a track width direction, detects an off-track amount from a change in amplitude value of a preamble part of a sector, reads out the correlation and deviation of the noises according to said off-track amount from said storing unit, and uses them for decoding.

8. An apparatus according to claim 1, wherein said noise correlation arithmetic operating unit stores the correlation and deviation of the noises into said storing unit every zone, every cylinder, or every sector and uses them for each decoding.

9. An apparatus according to claim 1, wherein said noise correlation arithmetic operating unit obtains the correlation and deviation of the noises from a reproduced signal of a training series recorded in a training sector or a training cylinder of a medium.

10. An apparatus according to claim 1, wherein said noise correlation arithmetic operating unit obtains the correlation and deviation of the noises by correcting the correlation and deviation of the noises stored in said storing unit in accordance with an amplitude value of a preamble of every sector of a medium.

11. An apparatus according to claim 1, wherein said noise correlation arithmetic operating unit calculates the correlation and deviation of the noises again at certain specific timing and updates said storing unit.

12. An information recording and reproducing apparatus comprising:

an equalizer having an equalization target in which noises obtained after an equalization become close to white noises by training;

a noise correlation arithmetic operating unit which calculates a deviation of noises for a present time point which depend on input signal patterns of the present time point and input signal pattern of the past or future in response to an input signal from said equalizer;

a storing unit which stores said deviation of said noises; and an input signal arithmetic operating unit which calculates an input signal of a decoder from said deviation stored in said storing unit, the input signal pattern of the present time point referencing an input signal being processed at present, the input signal pattern of the past denoting a first input signal series of a first predetermined number of bits which is time-precedent to the present time point, the input signal pattern of the future denoting a second input signal series of a second predetermined number of bits which is time-subsequent to the present time point.

13. An apparatus according to claim 12, wherein said decoder performs an MAP (Maximum A posteriori Probability) decoding or a Viterbi decoding as an iterative decoding.

14. An apparatus according to claim 12, wherein said noise correlation arithmetic operating unit obtains an equalized waveform mean value of a shortest path whose path metric is minimum among all of paths in past and future intervals which pass through a path which is shifted from a time point that is one-precedent to the present time point, to the present time point, and presumes white equalization noise values.

15. An apparatus according to claim 12, wherein said noise correlation arithmetic operating unit processes the input signal patterns of only the past or future time points as targets.

16. An apparatus according to claim 12, wherein said noise correlation arithmetic operating unit obtains a mean value of equalized signals for the input signal patterns and obtains the deviation of the noises which depend on the input signal patterns on the basis of a difference between an equalized waveform and said mean value.

17. An apparatus according to claim 12, wherein in case of magnetically recording and reproducing a code with restriction conditions such as an MTR restriction , said noise cotTelation arithmetic operating unit obtains the deviation of the noises which depend on the input signal patterns by training using random input signals without a restriction.

18. An apparatus according to claim 12, wherein said noise correlation arithmetic operating unit stores said deviation of the noises into said storing unit at predetermined off-track intervals of a reproducing head in a track width direction, detects an off-track amount from a change in amplitude value of a preamble of a medium, reads out said deviation of the noises according to said off-track amount from said storing unit, and uses it for decoding.

19. An apparatus according to claim 12, wherein said noise correlation arithmetic operating unit stores said deviation of the noises into said storing unit every zone, every cylinder, or every sector and uses it for each decoding.

20. An apparatus according to claim 12, wherein said noise correlation arithmetic operating unit obtains the deviation of the noises from a reproduced signal of a training series recorded in a training sector or a training cylinder of a medium.

21. An apparatus according to claim 12, wherein said noise correlation arithmetic operating unit obtains the deviation of the noises by correcting said deviation of the noises stored in said storing unit in accordance with an amplitude value of a preamble of every sector of a medium.

22. An apparatus according to claim 12, wherein said noise correlation arithmetic operating unit calculates the deviation of the noises again at certain specific timing and updates said storing unit.

23. An information recording and reproducing method comprising the steps of:

obtaining a deviation of noises and a correlation of the noises for a present time point which depend on input signal patterns of the present time point and input signal patterns of the past or future by training and storing them;

obtaining white noise values for said input signal patterns in which colored noises are converted into white noises by using said correlation and deviation of the noises; and calculating an input signal of a decoding process from said white noise values and a deviation of the white noises.

24. A method according to claim 23, wherein in said decoding process, an MAP (Maximum A posteriori Probability) decoding or a Viterbi decoding is performed as an iterative decoding.

25. A method according to claim 23, wherein an equalized waveform mean value of a shortest path whose path metric is minimum among all of paths in past and future intervals which pass through a path which is shifted from a time point that is one-precedent to the present time point, to the present time point, is obtained and white equalization noise values are presumed.

26. A method according to claim 23, wherein the input signal patterns of only the past or future time points are processed as targets.

27. A method according to claim 23, wherein a mean value of equalized signals for the input signal patterns is obtained and the correlation and deviation of the noises which depend on the input signal patterns are obtained on the basis of a difference between an equalized waveform and said mean value.

28. A method according to claim 23, wherein in case of magnetically recording and reproducing a code with restriction conditions such as an MTR restriction, the correlation and deviation of the noises which depend on the input signal patterns are obtained by training using random input signals without a restriction.

29. A method according to claim 23, wherein the correlation and deviation of the noises are stored into a storing unit at predetermined off-track intervals of a reproducing head in a track width direction, an off-track amount is detected from a change in amplitude value of a preamble part of a sector, and the correlation and deviation of the noises according to said off-track amount are read out from said storing unit and used for decoding.

30. A method according to claim 23, wherein the correlation and deviation of the noises are stored every zone, every cylinder, or every sector and used for each decoding.

31. A method according to claim 23, wherein the correlation and deviation of the noises are obtained from a reproduced signal of a training series recorded in a training sector or a training cylinder of a medium.

32. A method according to claim 23, wherein the stored correlation and deviation of the noises are obtained by correcting the correlation and deviation of the noises in accordance with an amplitude value of a preamble of every sector of a medium.

33. A method according to claim 23, wherein the correlation and deviation of the noises are calculated again at certain specific timing and storage contents are updated.

34. An information recording and reproducing method comprising the steps of:
calculating a deviation of noises at a present time point which depend on input signal patterns of the present time point and input signal patterns of the past or future by training, with respect to an equalized signal in which noises obtained after an equalization become close to white noises as a target and storing said deviation; and
calculating an input signal of a decoding process from said stored deviation,
the input signal pattern of the present time point referencing an input signal being processed at present, the input signal pattern of the past denoting a first input signal series of a first predetermined number of bits which is time-precedent to the present time point, the input signal pattern of the future denoting a second input signal series of a second predetermined number of bits which is time-subsequent to the present time point.

35. A method according to claim 34, wherein in said decoding process, an MAP (Maximum A posteriori Probability) decoding or a Viterbi decoding is performed as an iterative decoding.

36. A method according to claim 34, wherein an equalized waveform mean value of a shortest path whose path metric is minimum among all of paths in past and future intervals which pass through a path which is shifted from a time point that is one-precedent to the present time point, to the present time point, is obtained and white equalization noise values are presumed.

37. A method according to claim 34, wherein the input signal patterns of only the past or future time points are processed as targets.

38. A method according to claim 34, wherein a mean value of equalized signals for the input signal patterns is obtained and the deviation of the noises which depend on the input signal patterns are obtained on the basis of a difference between an equalized waveform and said mean value.

39. A method according to claim 34, wherein in case of magnetically recording and reproducing a code with restriction conditions such as an MTR restriction, the deviation of the noises which depend on the input signal patterns are obtained by training using random input signals without a restriction.

40. A method according to claim 34, wherein the deviation of the noises are stored into a storing unit at predetermined off-track intervals of a reproducing head in a track width direction, an off-track amount is detected from a change in amplitude value of a preamble part of a sector, and the deviation of the noises according to said off- track amount are read out from said storing unit and used for decoding.

41. A method according to claim 34, wherein the deviation of the noises are stored every zone, every cylinder, or every sector and used for each decoding.

42. A method according to claim 34, wherein the deviation of the noises are obtained from a reproduced signal of a training series recorded in a training sector or a training cylinder of a medium.

43. A method according to claim 34, wherein the stored deviation of the noises are obtained by correcting the deviation of the noises in accordance with an amplitude value of a preamble of every sector of a medium.

44. A method according to claim 34, wherein the deviation of the noises are calculated again at certain specific timing and storage contents are updated.

45. A signal decoding circuit comprising:
a noise correlation arithmetic operating unit which calculates a deviation of noises and a correlation of the noises for a present state which depend on input signal patterns of the present state, and past or future states by training;
a storing unit which stores said correlation and deviation of said noises;
a white noise arithmetic operating unit which obtains white noise values for said input signal patterns in which colored noises are converted into white noises by using said correlation and deviation of the noises which were stored in said storing unit; and
an input signal arithmetic operating unit which calculates an input signal of a decoder from said white noise values and a deviation of the white noises,
the present state referencing an input signal being processed at present, the past state denoting a first input signal series which is time-precedent to the present state input signal pattern, the future state denoting a second input signal series which is time-subsequent to the present state input signal pattern.

46. A circuit according to claim 45, wherein said decoder performs an MAP (Maximum A posteriori Probability) decoding or a Viterbi decoding as an iterative decoding.

47. A circuit according to claim 45, wherein said white noise arithmetic operating unit obtains an equalized waveform mean value of a shortest path whose path metric is minimum among all of paths in past and future intervals which pass through a path which is shifted from a state that is one-precedent to the present state, to the present state, and presumes white equalized noise values.

48. A circuit according to claim 45, wherein said noise correlation arithmetic operating unit processes the input signal patterns of only the past or future states as targets.

49. A circuit according to claim 45, wherein said noise correlation arithmetic operating unit obtains a mean value of equalized signals for the input signal patterns and obtains the correlation and deviation of the noises which depend on the input signal patterns on the basis of a difference between an equalized waveform and said mean value.

50. A circuit according to claim 45, wherein in case of magnetically recording and reproducing a code with restriction conditions such as an MTR restriction, said noise correlation arithmetic operating unit obtains the correlation and deviation of the noises which depend on the input signal patterns by training using random input signals without a restriction.

51. A circuit according to claim 45, wherein said noise correlation arithmetic operating unit stores said correlation and deviation of the noises into said storing unit at predetermined off-track intervals of a reproducing head in a track width direction, detects an off-track amount from a change in amplitude value of a preamble part of a sector, reads out the correlation and deviation of the noises according to said off-track amount from said storing unit, and uses them for decoding.

52. A circuit according to claim 45, wherein said noise correlation arithmetic operating unit stores the correlation and deviation of the noises into said storing unit every zone, every cylinder, or every sector and uses them for each decoding.

53. A circuit according to claim 45, wherein said noise correlation arithmetic operating unit obtains the correlation and deviation of the noises from a reproduced signal of a training series recorded in a training sector or a training cylinder of a medium.

54. A circuit according to claim 45, wherein said noise correlation arithmetic operating unit obtains the correlation and deviation of the noises by correcting the correlation and deviation of the noises stored in said storing unit in accordance with an amplitude value of a preamble of every sector of a medium.

55. A circuit according to claim 45, wherein said noise correlation arithmetic operating unit calculates the correlation and deviation of the noises again at certain specific timing and updates said storing unit.

56. A signal decoding circuit comprising:
- an equalizer having an equalization target in which noises obtained after an equalization become close to white noises by training;
- a noise correlation arithmetic operating unit which calculates a deviation of noises for a present time point which depend on input signal patterns of the present time point and past or future in response to an input signal from said equalizer;
- a storing unit which stores said deviation of said noises; and
- an input signal arithmetic operating unit which calculates an input signal of a decoder from said deviation stored in said storing unit,
- the input signal pattern of the present time point referencing an input signal being processed at present, the input signal paffern of the past denoting a first input signal series of a first predetermined number of bits which is time-precedent to the present time point, the input signal pattern of the future denoting a second input signal series of a second predetermined number of bits which is time-subsequent to the present time point.

57. A circuit according to claim 56, wherein an MAP (Maximum A posteriori Probability) decoding or a Viterbi decoding is performed as an iterative decoding.

58. A circuit according to claim 56, wherein said noise correlation arithmetic operating unit obtains an equalized waveform mean value of a shortest path whose path metric is minimum among all of paths in past and future intervals which pass through a path which is shifted from a time point that is one-precedent to the present time point, to the present time point, and presumes white equalization noise values.

59. A circuit according to claim 56, wherein said noise correlation arithmetic operating unit processes the input signal patterns of only the past or future time points as targets.

60. A circuit according to claim 56, wherein said noise correlation arithmetic operating unit obtains a mean value of equalized signals for the input signal patterns and obtains the deviation of the noises which depend on the input signal patterns on the basis of a difference between an equalized waveform and said mean value.

61. A circuit according to claim 56, wherein in case of magnetically recording and reproducing a code with restriction conditions such as an MTR restriction, said noise correlation arithmetic operating unit obtains the deviation of the noises which depend on the input signal patterns by training using random input signals without a restriction.

62. A circuit according to claim 56, wherein said noise correlation arithmetic operating unit stores said deviation of the noises into said storing unit at predetermined off-track intervals of a reproducing head in a track width direction, detects an off-track amount from a change in amplitude value of a preamble part of a sector, reads out said deviation of the noises according to said off-track amount from said storing unit, and uses it for decoding.

63. A circuit according to claim 56, wherein said noise correlation arithmetic operating unit stores said deviation of the noises into said storing unit every zone, every cylinder, or every sector and uses it for each decoding.

64. A circuit according to claim 56, wherein said noise correlation arithmetic operating unit obtains the deviation of the noises from a reproduced signal of a training series recorded in a training sector or a training cylinder of a medium.

65. A circuit according to claim 56, wherein said noise correlation arithmetic operating unit obtains the deviation of the noises by correcting said deviation of the noises stored in said storing unit in accordance with an amplitude value of a preamble of every sector of a medium.

66. A circuit according to claim 56, wherein said noise correlation arithmetic operating unit calculates the deviation of the noises again at certain specific timing and updates said storing unit.

* * * * *

UNITED STATES PATENT AND TRADEMARK OFFICE
CERTIFICATE OF CORRECTION

| | | |
|---|---|---|
| PATENT NO. | : 7,031,090 B2 | Page 1 of 1 |
| APPLICATION NO. | : 10/045738 | |
| DATED | : April 18, 2006 | |
| INVENTOR(S) | : Ichihara et al. | |

It is certified that error appears in the above-identified patent and that said Letters Patent is hereby corrected as shown below:

Col. 27, line 32, delete "paffern and insert --pattern--.

Signed and Sealed this

Twenty-second Day of August, 2006

JON W. DUDAS
*Director of the United States Patent and Trademark Office*